US012686409B2

(12) United States Patent
Fujino et al.

(10) Patent No.: US 12,686,409 B2
(45) Date of Patent: Jul. 21, 2026

(54) DRIVER MONITORING DEVICE AND METHOD USING CRITERION BASED ON SURROUNDING VEHICLES

(71) Applicants: TOYOTA JIDOSHA KABUSHIKI KAISHA, Toyota (JP); DENSO CORPORATION, Kariya-City (JP)

(72) Inventors: Jiro Fujino, Tokyo-to (JP); Kenichiroh Hara, Yokohama (JP); Satoru Kawakami, Tokyo-to (JP); Hiroshi Morimoto, Tokyo-to (JP); Kenta Yamada, Tokyo-to (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 108 days.

(21) Appl. No.: 18/591,594

(22) Filed: Feb. 29, 2024

(65) Prior Publication Data

US 2024/0317264 A1 Sep. 26, 2024

(30) Foreign Application Priority Data

Mar. 22, 2023 (JP) ................................. 2023-045207

(51) Int. Cl.
*B60W 60/00* (2020.01)
*B60W 50/14* (2020.01)
(Continued)

(52) U.S. Cl.
CPC ........ *B60W 60/0016* (2020.02); *B60W 50/14* (2013.01); *G06V 20/58* (2022.01);
(Continued)

(58) Field of Classification Search
None
See application file for complete search history.

(56) References Cited

U.S. PATENT DOCUMENTS

2015/0154461 A1* 6/2015 Kitaura ................ G06V 20/597
                                                         348/148
2016/0272215 A1* 9/2016 Laine ................... G06V 20/597
                           (Continued)

FOREIGN PATENT DOCUMENTS

JP        2009-086788 A    4/2009
JP        2013-254409 A    12/2013
                  (Continued)

OTHER PUBLICATIONS

English Translation of PCT KR 2022013306 (Goh et al.) published as WO 2024053752 A1; PCT filed Sep. 6, 2022 (Year: 2022).*

*Primary Examiner* — Abdhesh K Jha
*Assistant Examiner* — Tawri M Mcandrews
(74) *Attorney, Agent, or Firm* — Oliff PLC

(57) ABSTRACT

A driver monitoring device has a processor which acquires surrounding vehicle information, surrounding road environment information and driver line-of-sight direction information, performs autonomous driving or driving assistance of a host vehicle based on the surrounding vehicle information and the surrounding road environment information, determines whether the driver's visual recognition in a direction of travel of the host vehicle is sufficient, alerts the driver when the driver's visual recognition in the direction of travel of the host vehicle is not sufficient, changes non-visual recognition determination criterion used for determining that the driver's visual recognition in the direction of travel of the host vehicle is not sufficient; and changes the non-visual recognition determination criterion so that the greater the number of the stopped or decelerating surrounding vehicles in the surrounding region, the easier it becomes to be determined that the driver's visual recognition is not sufficient.

10 Claims, 9 Drawing Sheets

(51) Int. Cl.
 *G06V 20/58* (2022.01)
 *G06V 20/59* (2022.01)

(52) U.S. Cl.
 CPC ..... *G06V 20/597* (2022.01); *B60W 2420/403*
 (2013.01); *B60W 2540/225* (2020.02)

(56) References Cited

U.S. PATENT DOCUMENTS

| | | | | |
|---|---|---|---|---|
| 2017/0329001 A1* | 11/2017 | Brandt | .................. | G06V 20/58 |
| 2019/0283671 A1* | 9/2019 | Shimomura | .......... | G08G 1/166 |
| 2019/0310631 A1 | 10/2019 | Naruse et al. | | |
| 2021/0039638 A1 | 2/2021 | Yasui | | |
| 2023/0162609 A1* | 5/2023 | Fujimoto | .............. | G06V 20/58 |
| | | | | 340/904 |

FOREIGN PATENT DOCUMENTS

| | | | | | |
|---|---|---|---|---|---|
| JP | 2019-185390 A | 10/2019 | | | |
| JP | 2021-026720 A | 2/2021 | | | |
| WO | WO-2024053752 A1 * | 3/2024 | ............. | G06V 20/58 |

* cited by examiner

FIG. 5

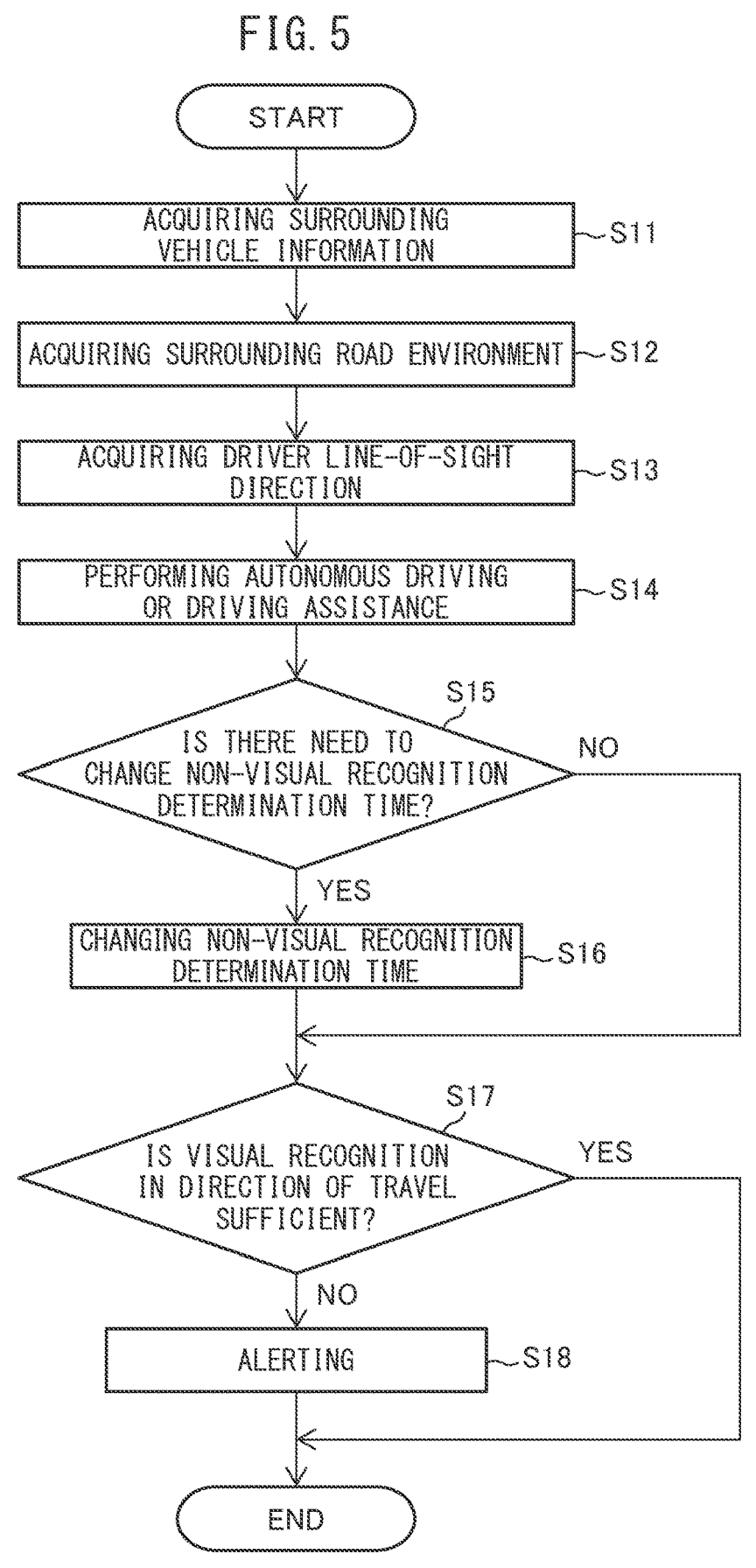

```
        ┌─────────────┐
        │    START    │
        └─────────────┘
               │
               ▼
   ┌───────────────────────────┐
   │  ACQUIRING SURROUNDING     │── S11
   │  VEHICLE INFORMATION       │
   └───────────────────────────┘
               │
               ▼
   ┌───────────────────────────────────┐
   │ ACQUIRING SURROUNDING ROAD         │── S12
   │ ENVIRONMENT                        │
   └───────────────────────────────────┘
               │
               ▼
   ┌───────────────────────────┐
   │  ACQUIRING DRIVER          │── S13
   │  LINE-OF-SIGHT DIRECTION   │
   └───────────────────────────┘
               │
               ▼
   ┌───────────────────────────┐
   │  PERFORMING AUTONOMOUS     │── S14
   │  DRIVING OR DRIVING        │
   │  ASSISTANCE                │
   └───────────────────────────┘
               │
               ▼
          ╱─────────────╲   S15
         ╱  IS THERE NEED  ╲
        ╱  TO CHANGE        ╲────── NO ──┐
        ╲  NON-VISUAL       ╱            │
         ╲ RECOGNITION     ╱             │
          ╲DETERMINATION  ╱              │
            ╲  TIME?   ╱                 │
               │ YES                     │
               ▼                         │
   ┌───────────────────────────┐         │
   │ CHANGING NON-VISUAL        │── S16   │
   │ RECOGNITION                │         │
   │ DETERMINATION TIME         │         │
   └───────────────────────────┘         │
               │◄────────────────────────┘
               ▼
          ╱─────────────╲   S17
         ╱ IS VISUAL      ╲
        ╱  RECOGNITION IN  ╲───── YES ──┐
        ╲  DIRECTION OF    ╱            │
         ╲ TRAVEL         ╱             │
          ╲ SUFFICIENT?  ╱              │
               │ NO                     │
               ▼                        │
   ┌───────────────────────────┐        │
   │        ALERTING           │── S18   │
   └───────────────────────────┘        │
               │◄───────────────────────┘
               ▼
        ┌─────────────┐
        │     END     │
        └─────────────┘
```

FIG. 9

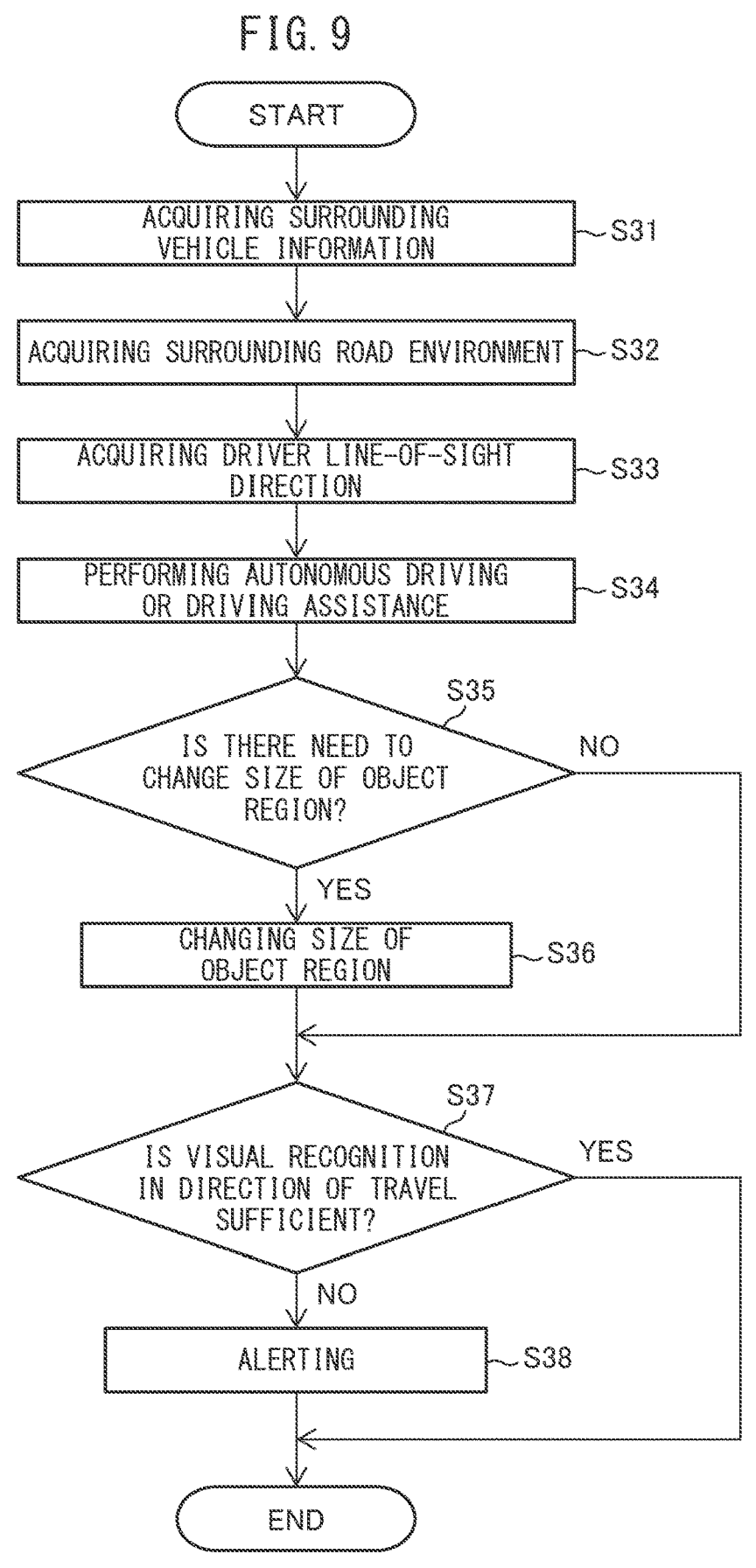

START

ACQUIRING SURROUNDING
VEHICLE INFORMATION  ~S31

ACQUIRING SURROUNDING ROAD ENVIRONMENT  ~S32

ACQUIRING DRIVER LINE-OF-SIGHT
DIRECTION  ~S33

PERFORMING AUTONOMOUS DRIVING
OR DRIVING ASSISTANCE  ~S34

S35
IS THERE NEED TO
CHANGE SIZE OF OBJECT
REGION?  NO

YES

CHANGING SIZE OF
OBJECT REGION  ~S36

S37
IS VISUAL RECOGNITION
IN DIRECTION OF TRAVEL
SUFFICIENT?  YES

NO

ALERTING  ~S38

END

1

DRIVER MONITORING DEVICE AND METHOD USING CRITERION BASED ON SURROUNDING VEHICLES

FIELD

The present disclosure relates to driver monitoring device, driver monitoring method, and non-transitory recording medium.

BACKGROUND

PTL 1 (Japanese Unexamined Patent Publication No. 2021-026720) describes the art of switching driving assistance control based on deviation of a risk region of surroundings of a vehicle and a position of a line-of-sight of a driver of the vehicle. In the art described in PTL 1, an announcing means is used for making announcements for indirectly guiding or directly guiding a driver.

In this regard, in the art described in PTL 1, it is not determined for example whether the driver's visual recognition for a pedestrian or other object in the direction of travel of the host vehicle is sufficient.

When a stopped surrounding vehicle exists in the direction of travel of the host vehicle, for example, pedestrian, two-wheeled vehicle, or other moving body may run out from behind the stopped surrounding vehicle toward the host vehicle. Therefore, if the same determination criterion is used as the criterion for determination of whether the driver's visual recognition in the direction of travel of the host vehicle is sufficient between a case where a stopped surrounding vehicle exists in the direction of travel of the host vehicle and a case where no stopped surrounding vehicle exists in the direction of travel of the host vehicle, conceivably suitable determination will not be able to be performed.

Further, when a decelerating surrounding vehicle (in more detail, decelerating oncoming vehicle) exists in the direction of travel of the host vehicle, for example a pedestrian trying to cross the road or other moving body may exist in the direction of travel of the decelerating oncoming vehicle and the decelerating oncoming vehicle may yield the road to that moving body and that moving body may run out toward the host vehicle (in more detail, in the direction of travel of the host vehicle). Therefore, for example, if the same determination criterion is used as the criterion for determination of whether the driver's visual recognition in the direction of travel of the host vehicle is sufficient between a case where a decelerating surrounding vehicle exists in the direction of travel of the host vehicle and a case where no decelerating surrounding vehicle exists in the direction of travel of the host vehicle, conceivably suitable determination will not be able to be performed.

For example, in a vehicle in which autonomous driving or driving assistance is performed, it is desirable to be able to suitably determine whether the driver's visual recognition in the direction of travel of the host vehicle is sufficient.

SUMMARY

In consideration of the above-mentioned point, the present disclosure has as its object to provide driver monitoring device, driver monitoring method, and non-transitory recording medium enabling suitable determination of whether the driver's visual recognition in the direction of travel of the host vehicle is sufficient.

(1) One aspect of the present disclosure is a driver monitoring device including a processor configured to: acquire surrounding vehicle information which is information showing stopped or decelerating surrounding vehicles in a surrounding region of a host vehicle, surrounding road environment information which is information showing road environment in the surrounding region, and driver line-of-sight direction information which is information showing direction of line-of-sight of a driver of the host vehicle; perform autonomous driving or driving assistance of the host vehicle based on the surrounding vehicle information and the surrounding road environment information; determine whether the driver's visual recognition in a direction of travel of the host vehicle is sufficient; alert the driver when the driver's visual recognition in the direction of travel of the host vehicle is not sufficient; change non-visual recognition determination criterion used for determining that the driver's visual recognition in the direction of travel of the host vehicle is not sufficient; and change the non-visual recognition determination criterion so that the greater the number of the stopped or decelerating surrounding vehicles in the surrounding region, the easier it becomes to be determined that the driver's visual recognition in the direction of travel of the host vehicle is not sufficient.

(2) In the driver monitoring device of the aspect (1), as the non-visual recognition determination criterion, a non-visual recognition determination time which is time when the driver must gaze at the direction of travel of the host vehicle may be used, and the processor may be configured to shorten the non-visual recognition determination time so that the greater the number of the stopped or decelerating surrounding vehicles in the surrounding region, the easier it becomes to be determined that time of the driver's gazing at the direction of travel of the host vehicle is shorter than the non-visual recognition determination time.

(3) In the driver monitoring device of the aspect (1) or (2), as the non-visual recognition determination criterion, a line-of-sight region which is a region in the direction of travel of the host vehicle which the driver must gaze at may be used, the processor may be configured to narrow the line-of-sight region so that the greater the number of the stopped or decelerating surrounding vehicles in the surrounding region, the easier it becomes to be determined that the line-of-sight region is not included in the region which the driver is gazing at, and the processor may be configured to determine that the driver's visual recognition in the direction of travel of the host vehicle is not sufficient if the region which the driver is gazing at during the non-visual recognition determination time which is time when the driver must gaze at the direction of travel of the host vehicle does not include the line-of-sight region.

(4) In the driver monitoring device of any one of the aspects (1) to (3), the line-of-sight region may include a region adjoining a stopped surrounding vehicle in the surrounding region where a moving body positioned on an opposite side of the host vehicle across the stopped surrounding vehicle in the surrounding region may run out toward the host vehicle.

(5) In the driver monitoring device of any one of the aspects (1) to (4), the line-of-sight region may include a region positioned between a decelerating surrounding vehicle in the surrounding region and an on-road parked surrounding vehicle in the surrounding region

3 where a moving body positioned between the decelerating surrounding vehicle in the surrounding region and the on-road parked surrounding vehicle in the surrounding region may run out toward the host vehicle.

(6) In the driver monitoring device of any one of the aspects (1) to (5), as the non-visual recognition determination criterion, an object region which is a region in the direction of travel of the host vehicle which the driver must gaze at may be used, the processor may be configured to broaden the object region so that the greater the number of the stopped or decelerating surrounding vehicles in the surrounding region, the easier it becomes to be determined that the region which the driver is gazing at is narrower than the object region, and the processor may be configured to determine that the driver's visual recognition in the direction of travel of the host vehicle is not sufficient if the region which the driver is gazing at during the non-visual recognition determination time which is time when the driver must gaze at the direction of travel of the host vehicle is narrower than the object region.

(7) In the driver monitoring device of any one of the aspects (1) to (6), the object region broadened by the processor may be a region combining a stopped vehicle region which is a region of a stopped surrounding vehicle in the surrounding region and an adjoining region which is a region adjoining the stopped vehicle region, and the adjoining region may be a region where a moving body which runs out toward the host vehicle can be positioned.

(8) In the driver monitoring device of any one of the aspects (1) to (7), the object region broadened by the processor is a region combining a decelerating vehicle region which is a region of a decelerating surrounding vehicle in the surrounding region and an intermediate region which is a region positioned between the decelerating vehicle region in the surrounding region and an on-road parked surrounding vehicle in the surrounding region, and the intermediate region is a region where a moving body which runs out toward the host vehicle can be positioned.

(9) Another aspect of the present disclosure is a driver monitoring method including: acquiring surrounding vehicle information which is information showing stopped or decelerating vehicles in a surrounding region of a host vehicle, surrounding road environment information which is information showing road environment in the surrounding region, and driver line-of-sight direction information which is information showing a direction of line-of-sight of a driver of the host vehicle; and performing autonomous driving or driving assistance of the host vehicle based on the surrounding vehicle information and the surrounding road environment information, wherein performing autonomous driving or driving assistance of the host vehicle includes determining whether the driver's visual recognition in a direction of travel of the host vehicle is sufficient, alerting the driver when the driver's visual recognition in the direction of travel of the host vehicle is not sufficient, and changing non-visual recognition determination criterion used for determining that the driver's visual recognition in the direction of travel of the host vehicle is not sufficient, the non-visual recognition determination criterion is changed so that the greater the number of the stopped or decelerating surrounding vehicles in the surrounding region, the easier it becomes to be determined that the driver's visual recognition in the direction of travel of the host vehicle is not sufficient.

(10) Still another aspect of the present disclosure is a non-transitory recording medium having recorded thereon a computer program for causing a processor to execute a process including: acquiring surrounding vehicle information which is information showing stopped or decelerating vehicles in a surrounding region of a host vehicle, surrounding road environment information which is information showing road environment in the surrounding region, and driver line-of-sight direction information which is information showing a direction of line-of-sight of a driver of the host vehicle; and performing autonomous driving or driving assistance of the host vehicle based on the surrounding vehicle information and the surrounding road environment information, wherein performing autonomous driving or driving assistance of the host vehicle includes determining whether the driver's visual recognition in a direction of travel of the host vehicle is sufficient, alerting the driver when the driver's visual recognition in the direction of travel of the host vehicle is not sufficient, and changing non-visual recognition determination criterion used for determining that the driver's visual recognition in the direction of travel of the host vehicle is not sufficient, the non-visual recognition determination criterion is changed so that the greater the number of the stopped or decelerating surrounding vehicles in the surrounding region, the easier it becomes to be determined that the driver's visual recognition in the direction of travel of the host vehicle is not sufficient.

According to the present disclosure, it is possible to suitably determine whether the driver's visual recognition in the direction of travel of the host vehicle is sufficient.

BRIEF DESCRIPTION OF DRAWINGS

FIG. 5 is a flow chart for explaining one example of processing performed by a processor 23 of the driver monitoring device 12 of the first embodiment.

FIG. 9 is a flow chart for explaining one example of processing performed by the processor 23 of the driver monitoring device 12 of a third embodiment.

DESCRIPTION OF EMBODIMENTS

Figure 1:
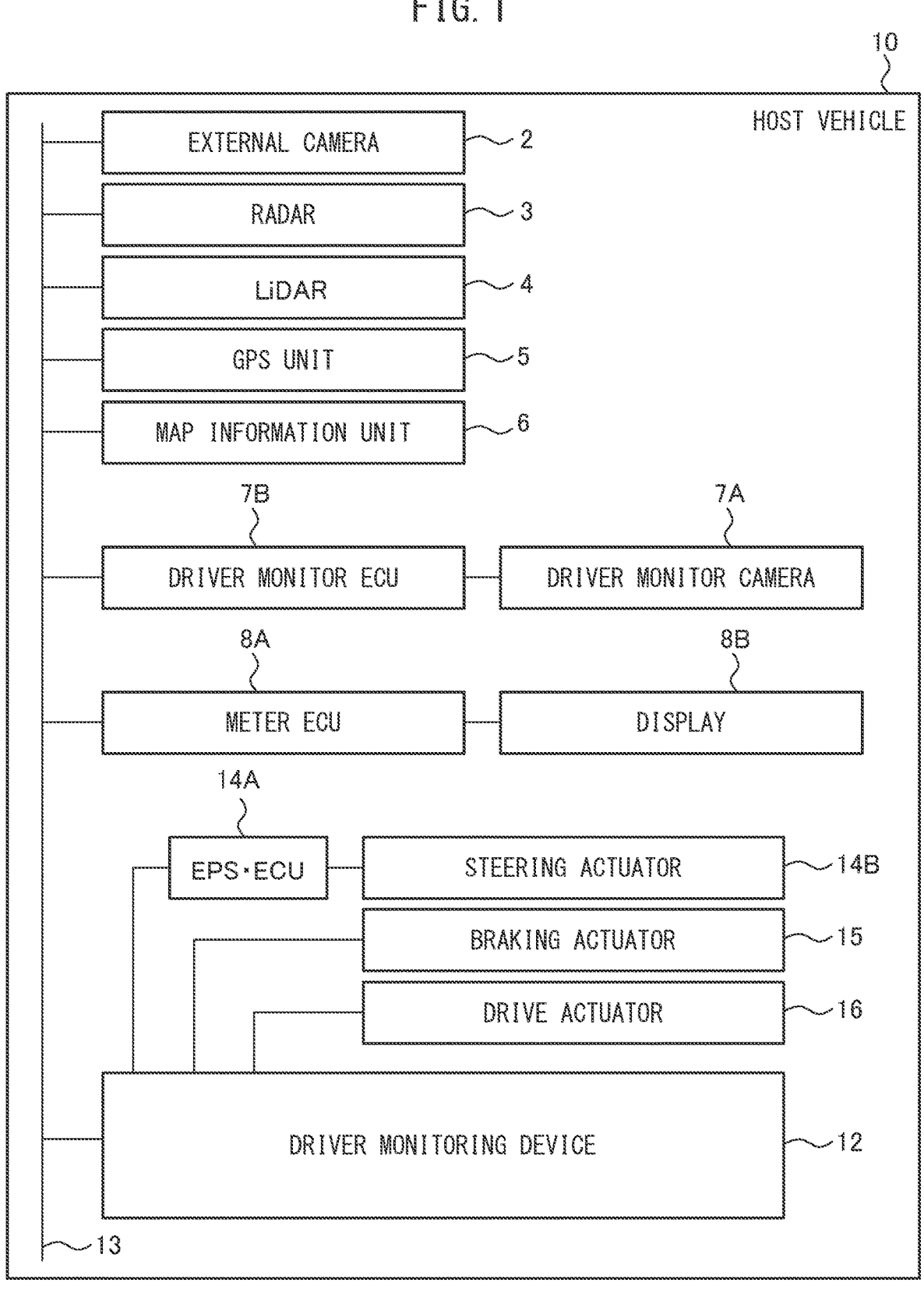
FIG. 1 is a view showing one example of the schematic configuration of a host vehicle 10 to which a driver monitoring device 12 of a first embodiment is applied.

Below, referring to the drawings, embodiments of driver monitoring device, driver monitoring method, and non-transitory recording medium of the present disclosure will be explained.

First Embodiment

Figure 2:
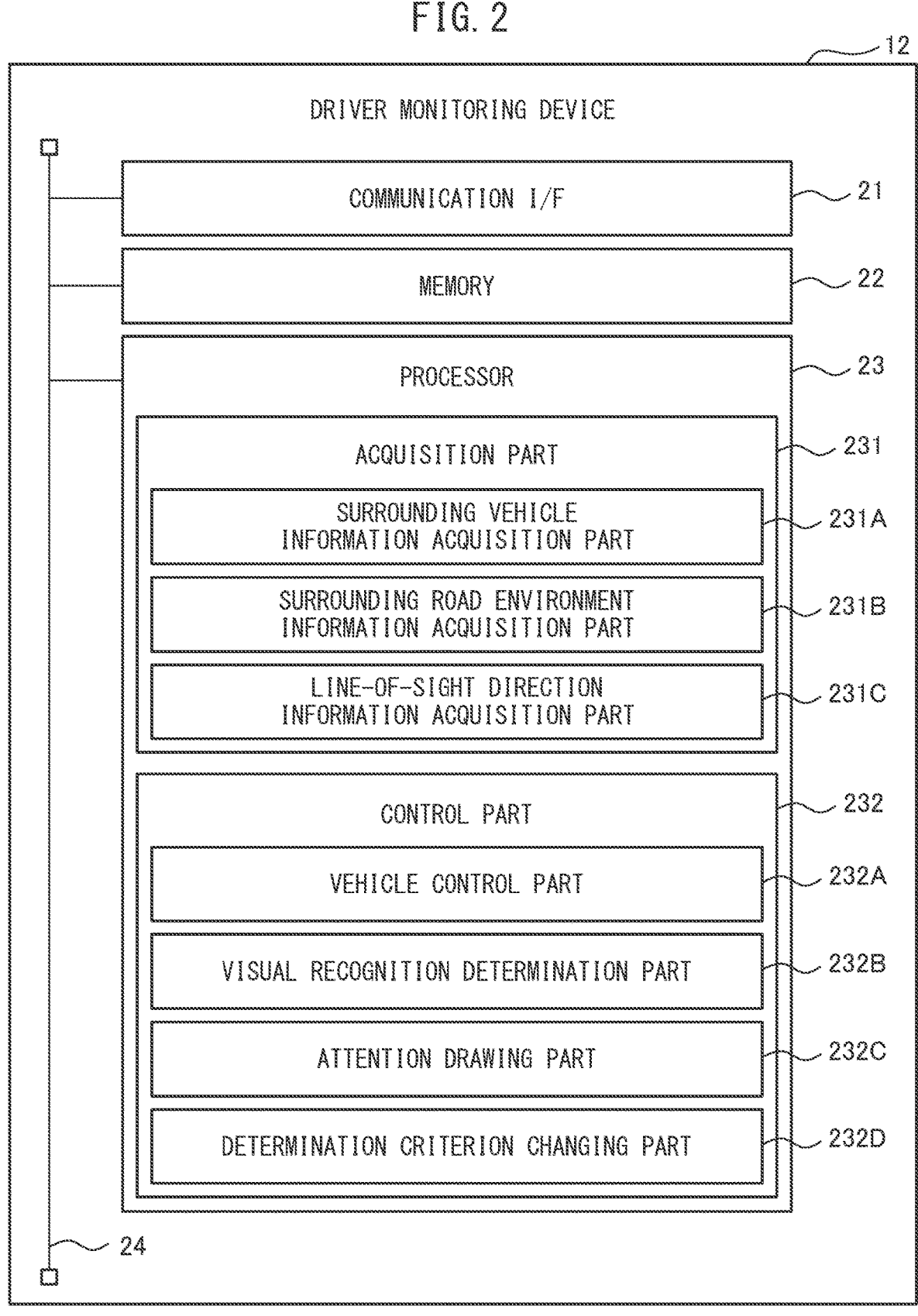
FIG. 2 is a view showing one example of the specific configuration of the driver monitoring device 12 shown in FIG. 1.

FIG. 1 is a view showing one example of the schematic configuration of a host vehicle 10 to which a driver monitoring device 12 of a first embodiment is applied. FIG. 2 is a view showing one example of the specific configuration of the driver monitoring device 12 shown in FIG. 1.

In the example shown in FIG. 1 and FIG. 2, the host vehicle 10 is provided with external camera 2, radar 3, LiDAR (light detection and ranging device) 4, and driver monitoring device 12. The external camera 2 captures an image showing surrounding vehicles of the host vehicle 10 (other vehicles existing in a surrounding region of the host vehicle 10) and road environment (for example, the road structure, rules, etc.) of the surrounding region of the host vehicle 10 and generates image data showing the surrounding vehicles and the road environment in the surrounding region and sends it to the driver monitoring device 12. The radar 3 is, for example, a millimeter wave radar, 24 GHz band narrow band region radar, etc., detects relative positions and relative speeds of the surrounding vehicles and the road structure in the surrounding region with respect to the host vehicle 10, and sends the results of detection to the driver monitoring device 12. The LiDAR 4 detects the relative positions and the relative speeds of the surrounding vehicles and the road structure in the surrounding region with respect to the host vehicle 10 and sends the results of detection to the driver monitoring device 12.

The external camera 2, the radar 3, and the LiDAR 4 detect objects outside the host vehicle 10 to thereby detect the possibility of collision of the host vehicle 10.

Further, the host vehicle 10 is provided with GPS (global positioning system) unit 5 and map information unit 6. The GPS unit 5 acquires position information showing the current position of the host vehicle 10 based on the GPS signal and sends the position information of the host vehicle 10 to the driver monitoring device 12. The map information unit 6 is, for example, formed in HDD (hard disk drive), SSD (solid state drive), or other storage mounted in the host vehicle 10. The map information of the map information unit 6 includes the road structure (position of the road, shape of the road, lane structure, etc.), rules, and various other information.

Furthermore, the host vehicle 10 is provided with a driver monitor camera 7A, driver monitor ECU (electronic control unit) 7B, meter ECU 8A, and display 8B.

The driver monitor camera 7A captures an image showing a face of a driver of the host vehicle 10. The driver monitor camera 7A is connected to the driver monitor ECU 7B. The driver monitor ECU 7B detects direction of line-of-sight of the driver of the host vehicle 10 based on the image showing the face of the driver of the host vehicle 10 captured by the driver monitor camera 7A and sends the results of detection to the driver monitoring device 12. Further, the driver monitor ECU 7B detects distracted driving, sleep, or other driver distractions of the driver of the host vehicle 10 based on the image of the face of the driver of the host vehicle 10 captured by the driver monitor camera 7A and sends the results of detection to the driver monitoring device 12.

The meter ECU 8A receives commands from the driver monitoring device 12 and controls the display 8B based on the commands of the driver monitoring device 12. The meter ECU 8A is connected to the display 8B. The display 8B displays warning etc. to the driver of the host vehicle 10 based on the commands of the driver monitoring device 12.

The external camera 2, the radar 3, the LiDAR 4, the GPS unit 5, the map information unit 6, the driver monitor ECU 7B, the meter ECU 8A and the driver monitoring device 12 are connected via an internal vehicle network 13.

Further, the host vehicle 10 is provided with EPS (electric power steering) ECU 14A and steering actuator 14B. The EPS ECU 14A and the steering actuator 14B configure an electric power steering system. The EPS ECU 14A is connected to the steering actuator 14B. The steering actuator 14B is, for example, a steering motor etc. The EPS ECU 14A is a control device of the electric power steering system and is provided with microcomputer and motor drive circuit as main parts. The EPS ECU 14A uses a steering torque sensor (not shown) provided at a steering shaft (not shown) to detect a steering torque which the driver of the host vehicle 10 imparts to the steering handle (not shown) and drives and controls the steering motor (steering actuator 14B) based on this steering torque so as to impart a steering torque to a steering mechanism to assist a steering operation of the driver.

In the example shown in FIG. 1 and FIG. 2, the host vehicle 10 is provided with the EPS ECU 14A and the steering actuator 14B, but in another example, instead of the EPS ECU 14A and the steering actuator 14B, the host vehicle 10 may, for example, be provided with electric pump type hydraulic power steering, steer-by-wire steering system, rear wheel steering system, or other such steering actuator.

In the example shown in FIG. 1 and FIG. 2, the host vehicle 10 is provided with braking actuator 15 and drive actuator 16. The braking actuator 15 has the function of causing the host vehicle 10 to decelerate. The braking actuator 15 includes, for example, a hydraulic brake, power regeneration brake, etc. The drive actuator 16 has the function of causing the host vehicle 10 to accelerate. A drive actuator 16, for example, includes an engine, EV (electric vehicle) system, hybrid system, fuel cell system, etc.

In the example shown in FIG. 1 and FIG. 2, the driver monitoring device 12 is configured by an autonomous driving ECU or driving assistance ECU. The driver monitoring device 12 (autonomous driving ECU) is able to control the host vehicle 10 by a driving control level of the level 3 defined by the SAE (Society of Automotive Engineers), that is, a driving control level not requiring operation of the steering actuator 14B, braking actuator 15, and drive actuator 16 and monitoring of the surroundings of the host vehicle 10 by the driver. Alternatively, the driver monitoring device 12 (driving assistance ECU) is able to control the host vehicle 10 by a driving control level at which the driver is involved in driving of the host vehicle 10, for example, driving control levels of the levels 0 to 2 defined by the SAE.

The driver monitoring device 12 is configured by a microcomputer provided with communication interface (I/F) 21, memory 22, and processor 23. The communication interface 21, the memory 22, and the processor 23 are connected via signal lines 24. The communication interface 21 has an interface circuit for connecting the driver monitoring device 12 to the internal vehicle network 13. The memory 22 is one example of the storage part and, for example, has a volatile semiconductor memory and a non-volatile semiconductor memory. The memory 22 stores programs used in processing performed by the processor 23 and various data. The processor 23 has the function of performing autonomous driving or driving assistance of the host vehicle 10 etc.

In the example shown in FIG. 1 and FIG. 2, the driver monitoring device 12 is provided with a single processor 23, but in another example, the driver monitoring device 12 may be provided with several processors. Further, in the example shown in FIG. 1 and FIG. 2, the driver monitoring device 12 (the autonomous driving ECU or the driving assistance ECU) is configured by a single ECU, but in another example, the driver monitoring device 12 may be configured by several ECUs.

In a general sophisticated driving assistance system, steering assistance and deceleration assistance of the host vehicle is performed with respect to pedestrians, bicycle riders, or parked vehicles, the deceleration assistance of the host vehicle is performed with respect to a preceding vehicle, and the deceleration assistance of the host vehicle passing through a curve is performed. The driver of the host vehicle can safely enjoy them. However, when the driver of the host vehicle is driving distracted or falling asleep, if such driving assistance of the host vehicle is performed, the driver of the host vehicle is liable to become overconfident about the driving assistance system of the host vehicle and the driving assistance system of the host vehicle is not liable to be used by the originally anticipated correct method. The driver of the host vehicle has an obligation to drive the host vehicle while monitoring its surroundings at all times. For this reason, if the driving assistance system can determine that the driver of the host vehicle is not checking the surroundings of the host vehicle and is not correctly gazing at objects in the surroundings of the host vehicle when the driver of the host vehicle is driving distracted or falling asleep, the driving assistance system is required to read ahead and support driving operations of the driver of the host vehicle so that the host vehicle does not become too exposed to danger.

For example, when the driver of the host vehicle is not visually recognizing pedestrians and other objects in the direction of travel and therefore the possibility of the host vehicle and an object colliding rises, for example, in the art described in PTL 1, control of the brakes for mitigating collisions, warnings to the driver of the host vehicle, etc. are performed.

For example, when an object existing in the direction of travel of the host vehicle is a stopped surrounding vehicle, for example, there is a possibility of a pedestrian, two-wheeled vehicle, or other moving body running out from behind the stopped surrounding vehicle toward the host vehicle. A generally experienced driver drives while wary of the danger of "a pedestrian, two-wheeled vehicle, or other moving body possibly running out from behind the stopped surrounding vehicle toward the host vehicle" when a stopped surrounding vehicle exists in the direction of travel of the host vehicle.

In the art described in PTL 1, when the control system cannot detect for example a pedestrian, two-wheeled vehicle, or other moving body positioned behind the stopped surrounding vehicle, the control system cannot predict the danger of "a pedestrian, two-wheeled vehicle, or other moving body possibly running out from behind the stopped surrounding vehicle toward the host vehicle" and cannot alert the driver of the host vehicle.

For example, when an object existing in the direction of travel of the host vehicle is a decelerating surrounding vehicle (in more detail, a decelerating oncoming vehicle), for example a pedestrian trying to cross the road or other moving body may exist in the direction of travel of the decelerating oncoming vehicle and the decelerating oncoming vehicle may yield the road to that moving body. That moving body may run out toward the host vehicle (in more detail, in the direction of travel of the host vehicle). A generally experienced driver drives while wary of the danger of "a pedestrian crossing the road or other moving body possibly running out toward the host vehicle" when a decelerating surrounding vehicle exists in the direction of travel of the host vehicle.

In the art described in PTL 1, when the control system cannot detect for example a pedestrian trying to cross the road or other moving body, the control system cannot predict the danger of "a pedestrian trying to cross the road or other moving body possibly running out toward the host vehicle" and cannot alert the driver of the host vehicle.

In consideration of the above-mentioned point, in the example shown in FIG. 1 and FIG. 2, the processor 23 is provided with acquisition part 231 and control part 232. The acquisition part 231 is provided with surrounding vehicle information acquisition part 231A, surrounding road environment information acquisition part 231B, and line-of-sight direction information acquisition part 231C.

The surrounding vehicle information acquisition part 231A acquires surrounding vehicle information which is information showing positions, speeds, etc. of surrounding vehicles in the surrounding region of the host vehicle 10 (in more detail, region in which objects can be detected by the external camera 2, the radar 3, and the LiDAR 4). Specifically, the surrounding vehicle information acquisition part 231A has the function of recognizing the position of the surrounding vehicle (in more detail, the relative position of the surrounding vehicle with respect to the host vehicle 10), the speed (in more detail, the relative speed of the surrounding vehicle with respect to the host vehicle 10), etc. based on the image data showing the surrounding vehicle sent from the external camera 2. Further, the surrounding vehicle information acquisition part 231A has the function of recognizing the position, speed, etc. of the surrounding vehicle based on the results of detection of the relative position and relative speed of the surrounding vehicle with respect to the host vehicle 10 sent from the radar 3. Furthermore, the surrounding vehicle information acquisition part 231A has the function of recognizing the position, speed, etc. of the surrounding vehicle based on the results of detection of the relative position and relative speed of the surrounding vehicle with respect to the host vehicle 10 sent from the LiDAR 4.

In more detail, the surrounding vehicle information acquired by the surrounding vehicle information acquisition part 231A includes information showing stopped or decelerating surrounding vehicles in the surrounding region of the host vehicle 10.

The surrounding road environment information acquisition part 231B acquires surrounding road environment information which is information showing the road environment of the surrounding region of the host vehicle 10. Specifically, the surrounding road environment information acquisition part 231B has the function of recognizing the road structure (for example, positions of intersections etc.), rules, etc. of the surroundings of the host vehicle 10 based on image data showing the road environment (road structure, rules, etc.) of the surrounding region of the host vehicle 10 sent from the external camera 2. Further, the surrounding road environment information acquisition part 231B has the function of recognizing the positions of intersections etc. based on results of detection of the relative positions of the intersections etc. with respect to the host vehicle 10 sent from the radar 3. Furthermore, the surrounding road environment information acquisition part 231B has the function of recognizing the positions of the intersections etc. based on the results of detection of the relative positions of the intersections etc. with respect to the hot vehicle 10 sent from the LiDAR 4. Further, the surrounding road environment information acquisition part 231B has the function of recognizing the road structure, rules, etc. of the surroundings of the host vehicle 10 based on the map information sent from the map information unit 6.

That is, the surrounding vehicle information acquisition part 231A and surrounding road environment information acquisition part 231B of the acquisition part 231 have the function of recognizing objects (surrounding vehicles and surrounding road environment) existing in the surrounding region of the host vehicle 10. The object recognition may be performed based on information of any one of the external camera 2, the radar, the LiDAR 4, the GPS unit 5, and the map information unit 6. The object recognition may also be performed by sensor fusion combining several among these. In the object recognition, the type of the object, for example, whether the object is a moving body or a stationary object, is determined. When the object is a moving body, its position and speed are calculated. The position and speed of the moving body is, for example, calculated in a reference coordinate system centered about the host vehicle 10, having the width direction of the host vehicle 10 as the abscissa, and having the direction of travel as the ordinate.

In the example shown in FIG. 1 and FIG. 2, the surrounding vehicle information acquisition part 231A of the acquisition part 231 has a surrounding vehicle detection function for detecting a surrounding vehicle to be monitored among the objects recognized by the object recognition function.

When the host vehicle 10 is turning right at an intersection and an oncoming vehicle of the host vehicle 10 is stopped for turning right at that intersection, due to the surrounding vehicle detection function of the surrounding vehicle information acquisition part 231A, that oncoming vehicle is detected as the surrounding vehicle to be monitored.

Figure 3:
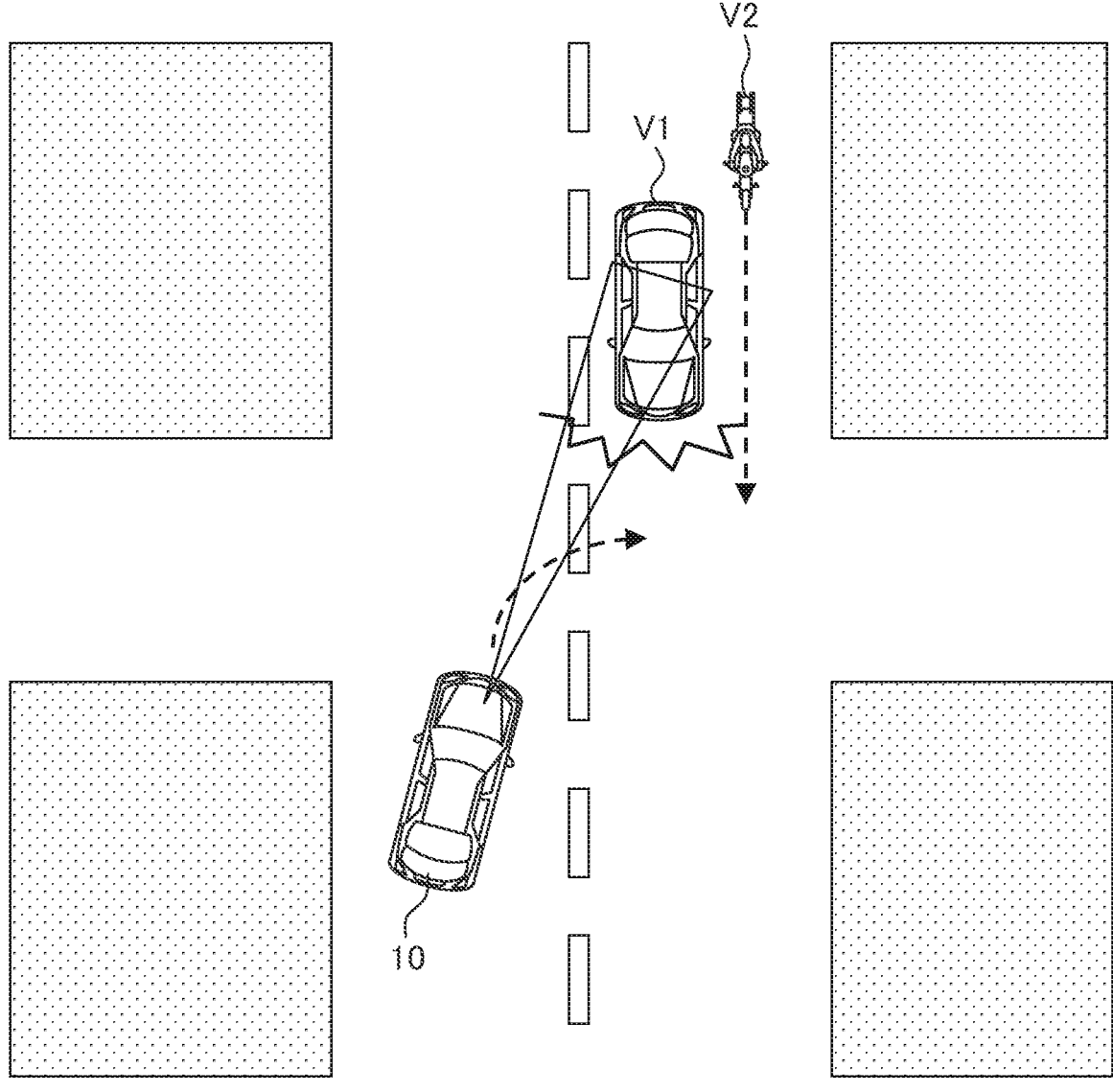
FIG. 3 is a view showing one example of a situation where the host vehicle 10 is turning right at an intersection and an oncoming vehicle (surrounding vehicle V1) of the host vehicle 10 is stopped for turning right at that intersection.

FIG. 3 is a view showing one example of a situation where the host vehicle 10 is turning right at an intersection and an oncoming vehicle (surrounding vehicle V1) of the host vehicle 10 is stopped for turning right at that intersection.

In the example shown in FIG. 3, when the host vehicle 10 turns right and passes in front of the surrounding vehicle V1, a surrounding vehicle V2 (two-wheeled vehicle) may run out from behind the stopped surrounding vehicle V1 (blind spot for the driver of the host vehicle 10) toward the host vehicle 10. For this reason, the driver of the host vehicle 10 must sufficiently visually recognize (gaze at) the direction of travel of the host vehicle 10 (in particular, the region adjoining the stopped surrounding vehicle V1 where the surrounding vehicle V2 positioned on an opposite side of the host vehicle 10 across the stopped surrounding vehicle V1 may run out toward the host vehicle 10).

As shown in the example shown in FIG. 3 (example showing a line-of-sight region of the driver of the host vehicle 10 by a triangular shape), if the driver of the host vehicle 10 gazes at only the stopped surrounding vehicle V1 and does not gaze at a region where the surrounding vehicle V2 may run out toward the host vehicle 10 (region on broken line arrow extending from surrounding vehicle V2), the possibility ends up becoming higher that the host vehicle 10 will collide with the surrounding vehicle V2.

In the example shown in FIG. 1 and FIG. 2, when the surrounding vehicle (in more detail, the oncoming vehicle) in the direction of travel of the host vehicle 10 is decelerating, the surrounding vehicle is detected as the surrounding vehicle to be monitored using the surrounding vehicle detection function of the surrounding vehicle information acquisition part 231A.

Figure 4:
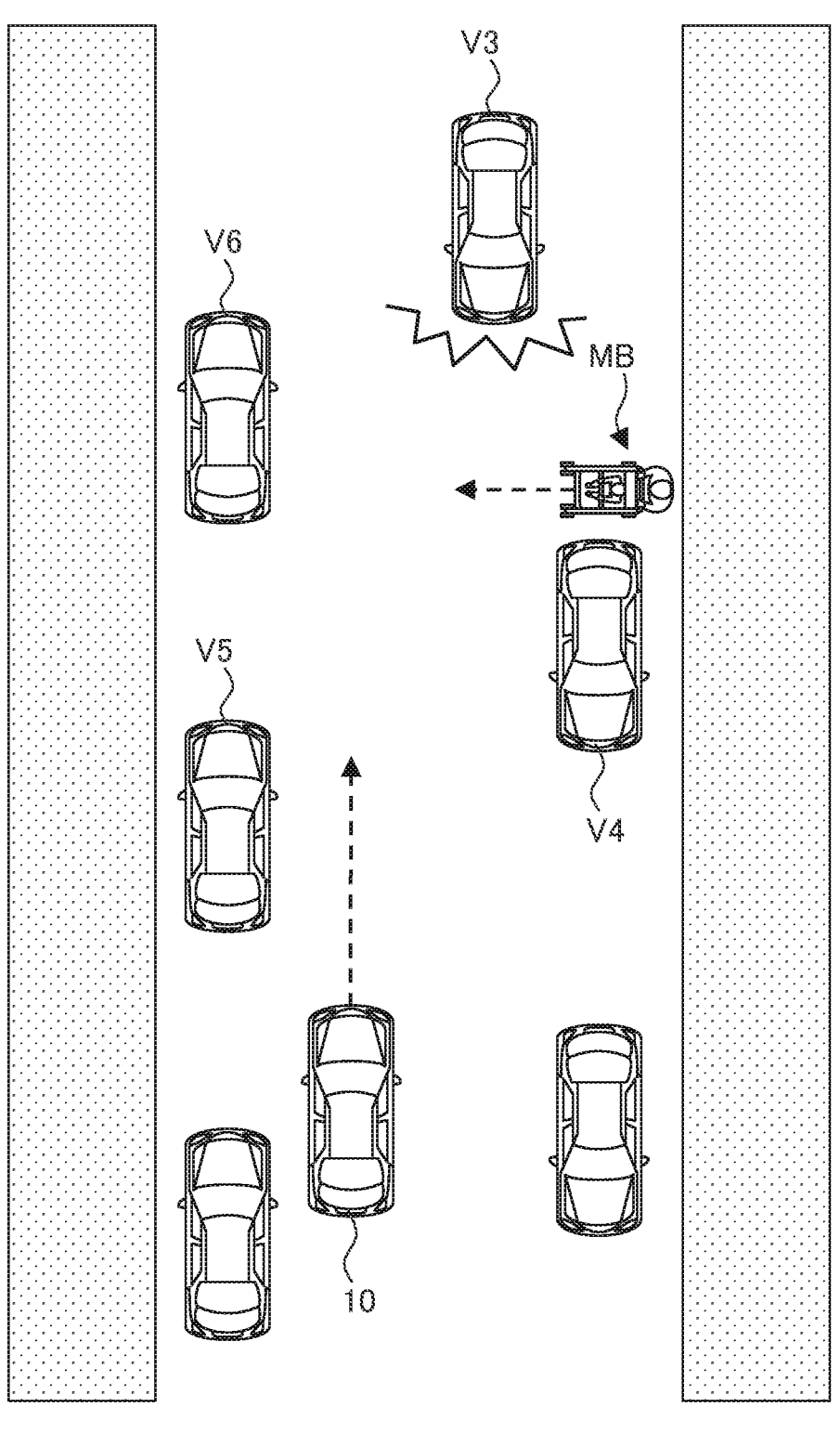
FIG. 4 is a view showing one example of a situation where an oncoming vehicle (surrounding vehicle V3) in a surrounding region in the direction of travel of the host vehicle 10 is decelerating.

FIG. 4 is a view showing one example of a situation where an oncoming vehicle (surrounding vehicle V3) in the surrounding region in the direction of travel of the host vehicle 10 is decelerating.

In the example shown in FIG. 4, when the host vehicle 10 passes the surrounding vehicle V3, a moving body MB such as pedestrian and baby carriage crossing the road may run out toward the host vehicle 10. For this reason, the driver of the host vehicle 10 must sufficiently visually recognize (gaze at) the direction of travel of the host vehicle 10 (in particular, the region where the moving body MB may run out from a region (blind spot for the driver of the host vehicle 10) between the decelerating surrounding vehicle V3 in the surrounding region of the host vehicle 10 and a surrounding vehicle V4, which is an on-road parked vehicle (parallel parked vehicle), in the surrounding region of the host vehicle 10 toward the host vehicle 10 (region on broken line arrow extending from moving body MB)).

If the driver of the host vehicle 10 does not gaze at the region where the moving body MB may run out toward the host vehicle 10, the possibility of the host vehicle 10 colliding with a moving body MB ends up rising.

In consideration of the above-mentioned point, in the example shown in FIG. 1 and FIG. 2, the line-of-sight direction information acquisition part 231C acquires driver line-of-sight direction information which is information showing the direction of line-of-sight of the driver of the host vehicle 10 (in more detail, results of detection of direction of line-of-sight of the driver of the host vehicle 10 sent by driver monitor ECU 7B). Further, the line-of-sight direction information acquisition part 231C acquires results of detection of distracted driving, sleep, or other driver distractions of the driver of the host vehicle 10 sent by the driver monitor ECU 7B.

Furthermore, in the example shown in FIG. 1 and FIG. 2, the control part 232 is provided with vehicle control part 232A, visual recognition determination part 232B, attention drawing part 232C, and determination criterion changing part 232D.

The vehicle control part 232A performs control of the steering actuator 14B, the braking actuator 15, and the drive actuator 16 based on the information acquired by the acquisition part 231. Further, the vehicle control part 232A has the function of performing autonomous driving or driving assistance of the host vehicle 10 based on the surrounding vehicle information acquired by the surrounding vehicle information acquisition part 231A and the surrounding road environment information acquired by the surrounding road environment information acquisition part 231B.

The visual recognition determination part 232B has the function of determining whether visual recognition in the direction of travel of the host vehicle 10 by the driver of the host vehicle 10 is sufficient. The visual recognition determination part 232B uses a non-visual recognition determination time which is time when the driver of the host vehicle 10 must gaze at the direction of travel of the host vehicle 10 as the non-visual recognition determination criterion for determining whether visual recognition in the direction of travel of the host vehicle 10 by the driver of the host vehicle 10 is sufficient. The visual recognition determination part 232B determines that the visual recognition in the direction of travel of the host vehicle 10 by the driver of the host vehicle 10 is not sufficient if gaze time in the direction of travel of the host vehicle 10 by the driver of the host vehicle 10 (the gaze time is, for example, calculated by the driver monitor ECU 7B based on the results of detection of the driver monitor camera 7A) is shorter than the non-visual recognition determination time. The visual recognition determination part 232B determines that the visual recognition in the direction of travel of the host vehicle 10 by the driver of the host vehicle 10 is sufficient if the time of gazing at the direction of travel of the host vehicle 10 by the driver of the host vehicle 10 is the non-visual recognition determination time or more.

Further, the visual recognition determination part 232B has the function of monitoring the driver of the host vehicle 10 based on results of detection of distracted driving, sleep, or other driver distractions of the driver of the host vehicle 10.

The attention drawing part 232C has the function of alerting the driver of the host vehicle 10 (in more detail, prompting the driver of the host vehicle 10 to sufficiently visually recognize the direction of travel of the host vehicle 10) when the visual recognition determination part 232B determines that the visual recognition in the direction of travel of the host vehicle 10 by the driver of the host vehicle 10 is not sufficient. The attention drawing part 232C alerts the driver of the host vehicle 10 by, for example, making the display 8B display a warning.

In another example, the attention drawing part 232C may, for example, make a vehicle-mounted speaker (not shown) etc. output a warning sound or make a vehicle-mounted vibration actuator (not shown) vibrate to thereby alert the driver of the host vehicle 10.

In the example shown in FIG. 1 and FIG. 2, the determination criterion changing part 232D has the function of changing the non-visual recognition determination time as the non-visual recognition determination criterion used by the visual recognition determination part 232B for determining that the visual recognition in the direction of travel of the host vehicle 10 by the driver of the host vehicle 10 is not sufficient. In more detail, the determination criterion changing part 232D changes the non-visual recognition determination criterion so that the greater the number of stopped or decelerating surrounding vehicles in the surrounding region of the host vehicle 10, the easier it becomes to be determined that the visual recognition in the direction of travel of the host vehicle 10 by the driver of the host vehicle 10 is not sufficient. Specifically, the determination criterion changing part 232D shortens the non-visual recognition determination time so that the greater the number of stopped or decelerating surrounding vehicles in the surrounding region of the host vehicle 10, the easier it becomes to be determined that the time of gazing at the direction of travel of the host vehicle 10 by the driver of the host vehicle 10 is shorter than the non-visual recognition determination time.

In the example shown in FIG. 3, the stopped surrounding vehicle V1 exists in the surrounding region of the host vehicle 10 (that is, there is the possibility of the host vehicle 10 colliding with the surrounding vehicle V2), so the determination criterion changing part 232D shortens the non-visual recognition determination time so that it becomes easier to be determined that the time of gazing at the direction of travel of the host vehicle 10 by the driver of the host vehicle 10 is shorter than the non-visual recognition determination time, compared with the case where the stopped surrounding vehicle V1 does not exist in the surrounding region of the host vehicle 10 (that is, the case where there is no possibility of the host vehicle 10 colliding with the surrounding vehicle V2). For this reason, the visual recognition determination part 232B can determine whether the visual recognition in the direction of travel of the host vehicle 10 by the driver of the host vehicle 10 is sufficient more suitably than the case where the non-visual recognition determination time is not made shorter.

In the example shown in FIG. 4, the decelerating surrounding vehicle V3 exists in the surrounding region of the host vehicle 10 (that is, there is the possibility of the host vehicle 10 colliding with the moving body MD), so the determination criterion changing part 232D shortens the non-visual recognition determination time so that it becomes easier to be determined that the time of gazing at the direction of travel of the host vehicle 10 by the driver of the host vehicle 10 is shorter than the non-visual recognition determination time, compared with the case where the decelerating surrounding vehicle V3 does not exist in the surrounding region of the host vehicle 10 (that is, the case where the possibility of the host vehicle 10 colliding with the moving body MD is low). For this reason, the visual recognition determination part 232B can determine whether the visual recognition in the direction of travel of the host vehicle 10 by the driver of the host vehicle 10 is sufficient more suitably than the case where the non-visual recognition determination time is not made shorter.

In more detail, in the example shown in FIG. 4, stopped (in more detail, on-road parked) surrounding vehicles V4, V5, and V6 exist in the surrounding region of the host vehicle 10. For this reason, there are the possibility of the moving body MD running out from behind the surrounding vehicle V4 (blind spot for the driver of the host vehicle 10) toward the host vehicle 10, the possibility of a moving body (not shown) running out from behind the surrounding vehicle V5 toward the host vehicle 10, and the possibility of a moving body (not shown) running out from behind the surrounding vehicle V6 toward the host vehicle 10. Therefore, the determination criterion changing part 232D shortens the non-visual recognition determination time so that it becomes easier to be determined that the time of gazing at the direction of travel of the host vehicle 10 by the driver of the host vehicle 10 is shorter than the non-visual recognition determination time, compared with the case where the stopped surrounding vehicles V4, V5, and V6 do not exist in the surrounding region of the host vehicle 10, the case where the stopped surrounding vehicle V4 exists in the surrounding region of the host vehicle 10, but the surrounding vehicles V5, V6 do not exist, the case where the stopped surrounding vehicle V5 exists in the surrounding region of the host vehicle 10, but the surrounding vehicles V4, V6 do not exist, the case where the stopped surrounding vehicle V6 exists in the surrounding region of the host vehicle 10, but the surrounding vehicles V4, V5 do not exist, the case where the stopped surrounding vehicles V4, V5 exist in the surrounding region of the host vehicle 10, but the surrounding vehicle V6 does not exist, the case where the stopped surrounding vehicles V4, V6 exist in the surrounding region of the host vehicle 10, but the surrounding vehicle V5 does not exist, and the case where the stopped surrounding vehicles V5, V6 exist in the surrounding region of the host vehicle 10, but the surrounding vehicle V4 does not exist. For this reason, the visual recognition determination part 232B can determine whether visual recognition in the direction of travel of the host vehicle 10 by the driver of the host vehicle 10 is sufficient more suitably than the case where the on-road parked surrounding vehicles V4, V5, and V6 are not considered.

FIG. 5 is a flow chart for explaining one example of processing performed by the processor 23 of the driver monitoring device 12 of the first embodiment.

In the example shown in FIG. 5, at step S11, the surrounding vehicle information acquisition part 231A of the acquisition part 231 acquires the surrounding vehicle information which is the information showing stopped or decelerating surrounding vehicles in the surrounding region of the host vehicle 10.

At step S12, the surrounding road environment information acquisition part 231B of the acquisition part 231 acquires the surrounding road environment information which is the information showing the road environment of the surrounding region of the host vehicle 10.

At step S13, the line-of-sight direction information acquisition part 231C of the acquisition part 231 acquires the driver line-of-sight direction information which is the information showing the direction of line-of-sight of the driver of the host vehicle 10.

At step S14, the vehicle control part 232A of the control part 232 performs autonomous driving or driving assistance of the host vehicle 10 based on the surrounding vehicle information acquired at step S11 and the surrounding road environment information acquired at step S12.

At step S15, the determination criterion changing part 232D of the control part 232 determines whether there is a need to change the non-visual recognition determination time as the non-visual recognition determination criterion used for determining that the visual recognition in the direction of travel of the host vehicle 10 by the driver of the host vehicle 10 is not sufficient. When the number of stopped or decelerating surrounding vehicles in the surrounding region of the host vehicle 10 changes, the determination criterion changing part 232D determines that there is a need to change the non-visual recognition determination time as the non-visual recognition determination criterion and proceeds to step S16. On the other hand, when the number of stopped or decelerating surrounding vehicles in the surrounding region of the host vehicle 10 does not change, the determination criterion changing part 232D determines that there is no need to change the non-visual recognition determination time as the non-visual recognition determination criterion and proceeds to step S17.

At step S16, the determination criterion changing part 232D changes the non-visual recognition determination time as the non-visual recognition determination criterion used for determining that the visual recognition in the direction of travel of the host vehicle 10 by the driver of the host vehicle 10 is not sufficient. In more detail, at step S16, the determination criterion changing part 232D changes the non-visual recognition determination time as the non-visual recognition determination criterion so that the greater the number of stopped or decelerating surrounding vehicles in the surrounding region of the host vehicle 10, the easier it becomes to be determined that the visual recognition in the direction of travel of the host vehicle 10 by the driver of the host vehicle 10 is not sufficient. Specifically, when the number of stopped or decelerating surrounding vehicles in the surrounding region of the host vehicle 10 increases, the determination criterion changing part 232D shortens the non-visual recognition determination time as the non-visual recognition determination criterion. On the other hand, when the number of stopped or decelerating surrounding vehicles in the surrounding region of the host vehicle 10 decreases, the determination criterion changing part 232D lengthens the non-visual recognition determination time as the non-visual recognition determination criterion. Next, it proceeds to step S17.

At step S17, the visual recognition determination part 232B of the control part 232 determines whether the visual recognition in the direction of travel of the host vehicle 10 by the driver of the host vehicle 10 is sufficient. When the time of gazing at the direction of travel of the host vehicle 10 by the driver of the host vehicle 10 is shorter than the non-visual recognition determination time as the non-visual recognition determination criterion, the visual recognition determination part 232B determines that the visual recognition in the direction of travel of the host vehicle 10 by the driver of the host vehicle 10 is not sufficient and proceeds to step S18. On the other hand, when the time of gazing at the direction of travel of the host vehicle 10 by the driver of the host vehicle 10 is the non-visual recognition determination time as the non-visual recognition determination criterion or more, the visual recognition determination part 232B determines that the visual recognition in the direction of travel of the host vehicle 10 by the driver of the host vehicle 10 is sufficient and ends the routine shown in FIG. 5.

At step S18, the attention drawing part 232C of the control part 232 alerts the driver of the host vehicle 10.

As explained above, in the host vehicle 10 to which the driver monitoring device 12 of the first embodiment is applied, the non-visual recognition determination time as the non-visual recognition determination criterion used for determining that the visual recognition in the direction of travel of the host vehicle 10 by the driver of the host vehicle 10 is not sufficient is increased or decreased in accordance with the number of stopped or decelerating surrounding vehicles in the surrounding region of the host vehicle 10. For this reason, it is possible to suitably determine whether visual recognition in the direction of travel of the host vehicle 10 by the driver of the host vehicle 10 is sufficient.

Furthermore, in the host vehicle 10 to which the driver monitoring device 12 of the first embodiment is applied, when the visual recognition in the direction of travel of the host vehicle 10 by the driver of the host vehicle 10 is not sufficient, attention is drawn prompting the driver of the host vehicle 10 to sufficiently visually recognize the direction of travel of the host vehicle 10. For this reason, it is possible to direct the attention of the driver of the host vehicle 10 to information (for example, information obtained by sufficiently visually recognizing the stopped surrounding vehicle V1, the decelerating surrounding vehicle V3, etc. in the direction of travel of the host vehicle 10) required for action to warn of danger (for example, warn of the danger of the surrounding vehicle V2 (see FIG. 3) possibly running out from behind the stopped surrounding vehicle V1 (see FIG. 3) toward the host vehicle 10, warn of the danger of the moving body MB (see FIG. 4) to which the decelerating surrounding vehicle V3 (see FIG. 4) gave the way running out toward the host vehicle 10, etc.)

Second Embodiment

The host vehicle 10 to which the driver monitoring device 12 of a second embodiment is applied is configured in the same way as the above-mentioned host vehicle 10 to which the driver monitoring device 12 of the first embodiment is applied except for the points explained later.

As explained above, in the driver monitoring device 12 of the first embodiment, the visual recognition determination part 232B uses the non-visual recognition determination time which is the time when the driver of the host vehicle 10 must gaze at the direction of travel of the host vehicle 10 as the non-visual recognition determination criterion for determining whether the visual recognition in the direction of travel of the host vehicle 10 by the driver of the host vehicle 10 is sufficient.

On the other hand, in the driver monitoring device 12 of the second embodiment, the visual recognition determination part 232B uses the line-of-sight region which is a region in the direction of travel of the host vehicle 10 which the driver of the host vehicle 10 must gaze at as the non-visual recognition determination criterion for determining whether the visual recognition in the direction of travel of the host vehicle 10 by the driver of the host vehicle 10 is sufficient.

As explained above, in the driver monitoring device 12 of the first embodiment, the determination criterion changing part 232D shortens the non-visual recognition determination time as the non-visual recognition determination criterion for raising the sensitivity of the visual recognition determination (that is, for making it easier to be determined that the visual recognition in the direction of travel of the host vehicle 10 by the driver of the host vehicle 10 is not sufficient).

On the other hand, in the driver monitoring device 12 of the second embodiment, the determination criterion changing part 232D narrows the line-of-sight region used as the non-visual recognition determination criterion so as to raise the sensitivity of the visual recognition determination.

Figure 6:
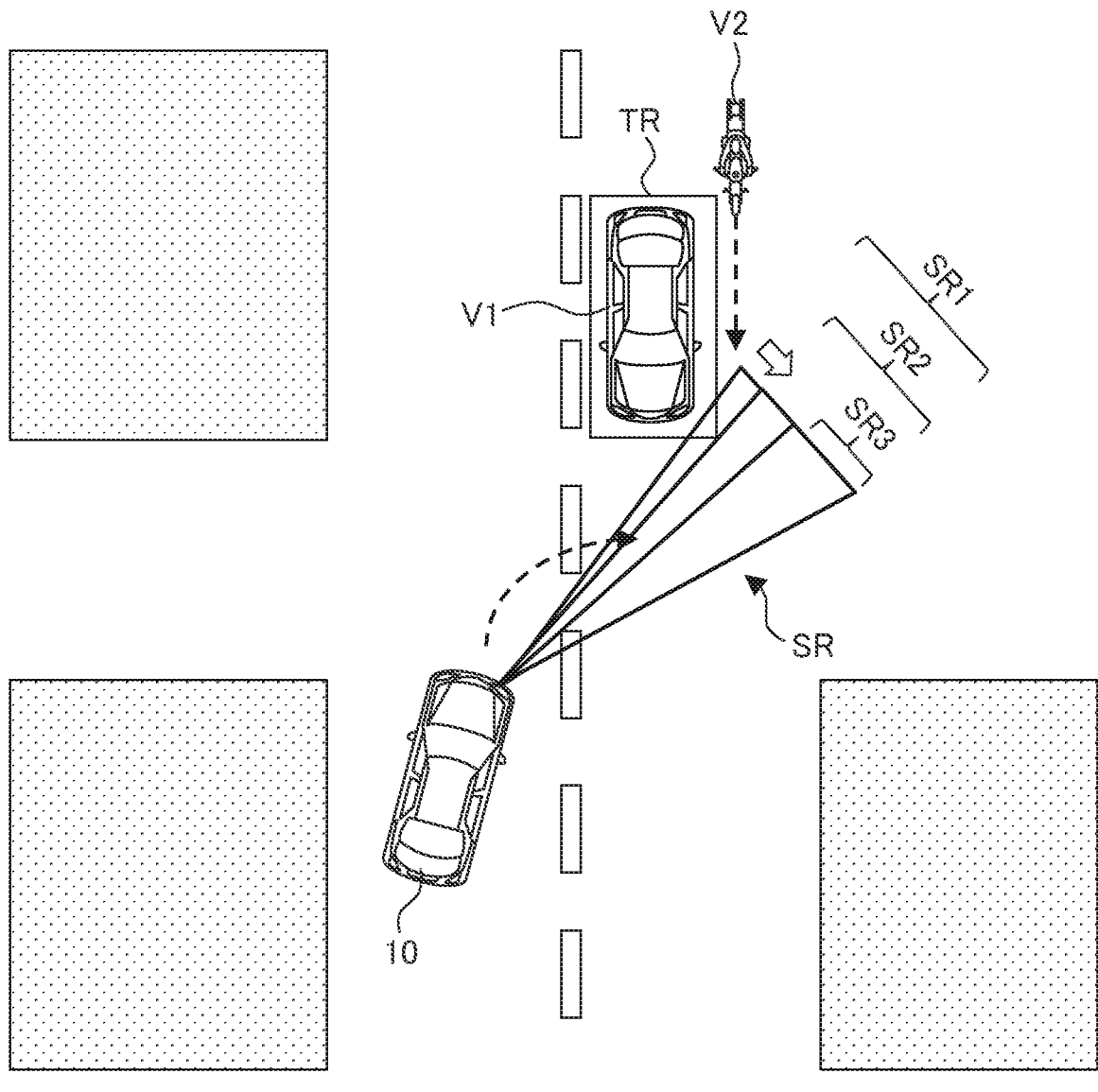
FIG. 6 is a view for explaining one example of line-of-sight regions SR (SR1, SR2, and SR3) as a non-visual recognition determination criterion.

FIG. 6 is a view for explaining one example of line-of-sight regions SR (SR1, SR2, and SR3) used as the non-visual recognition determination criterion.

In the example shown in FIG. 6, in the same way as the example shown in FIG. 3, the host vehicle 10 is turning right at the intersection and the oncoming vehicle (the surrounding vehicle V1) of the host vehicle 10 is stopped for turning right at that intersection. Further, when the host vehicle 10 turns right and passes in front of the surrounding vehicle V1, the surrounding vehicle V2 (two-wheeled vehicle) may run out from behind the stopped surrounding vehicle V1 (blind spot for the driver of the host vehicle 10) toward the host vehicle 10. For this reason, the driver of the host vehicle 10 must sufficiently visually check (gaze at) the direction of travel of the host vehicle 10 (in particular, the region adjoining the stopped surrounding vehicle V1 where the surrounding vehicle V2 positioned on the opposite side of the host vehicle 10 across the stopped surrounding vehicle V1 may run out toward the host vehicle 10).

However, an object region TR corresponding to the surrounding vehicle V1 detected as the object outside the host vehicle 10 by the external camera 2, the radar 3, and the LiDAR 4 docs not include the region adjoining the surrounding vehicle V1 (region where the surrounding vehicle V2 may run out toward the host vehicle 10). For this reason, by being based on only the object region TR corresponding to the surrounding vehicle V1 detected by the external camera 2, the radar 3, and the LiDAR 4, the driver of the host vehicle 10 cannot be made to gaze at the region adjoining the surrounding vehicle V1 (region where the surrounding vehicle V2 may run out toward the host vehicle 10).

In consideration of this point, in the driver monitoring device 12 of the second embodiment, the visual recognition determination part 232B of the control part 232 sets the line-of-sight region SR (the region of the direction of travel of the host vehicle 10 which the driver of the host vehicle 10 must gaze at) to the region adjoining the surrounding vehicle V1 (region where the surrounding vehicle V2 may run out toward the host vehicle 10).

Furthermore, the visual recognition determination part 232B determines that the visual recognition in the direction of travel of the host vehicle 10 by the driver of the host vehicle 10 is not sufficient if the driver of the host vehicle 10 does not gaze at the line-of-sight region SR even once (that is, if the region which the driver of the host vehicle 10 has gazed at does not include the line-of-sight region SR) during the non-visual recognition determination time which is the time when the driver of the host vehicle 10 must gaze at the direction of travel of the host vehicle 10. The attention drawing part 232C of the control part 232 alerts the driver of the host vehicle 10 when the visual recognition determination part 232B determines that the visual recognition in the direction of travel of the host vehicle 10 by the driver of the host vehicle 10 is not sufficient.

In the driver monitoring device 12 of the second embodiment, the determination criterion changing part 232D has the function of changing the line-of-sight region SR as the non-visual recognition determination criterion (in more detail, changing the size of the line-of-sight region SR) used by the visual recognition determination part 232B for determining that the visual recognition in the direction of travel of the host vehicle 10 by the driver of the host vehicle 10 is not sufficient.

The determination criterion changing part 232D narrows the line-of-sight region SR so that the greater the number of stopped or decelerating surrounding vehicles in the surrounding region of the host vehicle 10, the easier it becomes to be determined that the line-of-sight region SR is not included in the region which the driver of the host vehicle 10 is gazing at (the region which the driver of the host vehicle 10 is gazing at is, for example, calculated by the driver monitor ECU 7B based on the results of detection of the driver monitor camera 7A).

In the example shown in FIG. 6, the surrounding region of the host vehicle 10 includes only one stopped surrounding vehicle V1 (only one stopped surrounding vehicle V1 is detected by the external camera 2, the radar 3, and the LiDAR 4), so the line-of-sight region SR1 set by the visual recognition determination part 232B is set as the line-of-sight region SR.

In an example in which the surrounding region of the host vehicle 10 includes two stopped or decelerating surrounding vehicles (example where, in addition to the stopped surrounding vehicle V1, one stopped or decelerating surrounding vehicle (not shown) is detected by the external camera 2, the radar 3, and the LiDAR 4), the determination criterion changing part 232D narrows the line-of-sight region SR from the line-of-sight region SR1 to the line-of-sight region SR2. As a result, it becomes easier to be determined that the line-of-sight region SR is not included in the region which the driver of the host vehicle 10 is gazing at.

In an example where the surrounding region of the host vehicle 10 includes three or more stopped or decelerating vehicles (example where in addition to the stopped surrounding vehicle V1, two or more stopped or decelerating surrounding vehicles (not shown) are detected by the external camera 2, the radar 3, and the LiDAR 4), the determination criterion changing part 232D narrows the line-of-sight region SR from the line-of-sight region SR2 to the line-of-sight region SR3. As a result, it becomes easier to be determined that the line-of-sight region SR is not included in the region which the driver of the host vehicle 10 is gazing at.

In the example shown in FIG. 4, the region positioned between the decelerating surrounding vehicle V3 in the surrounding region of the host vehicle 10 and the on-road parked surrounding vehicle V4 in the surrounding region of the host vehicle 10 in which the moving body MD positioned between the surrounding vehicle V3 and surrounding vehicle V4 may run out toward the host vehicle 10 (region on broken line arrow extending from moving body MB) is set by the visual recognition determination part 232B as the line-of-sight region SR.

Figure 7:
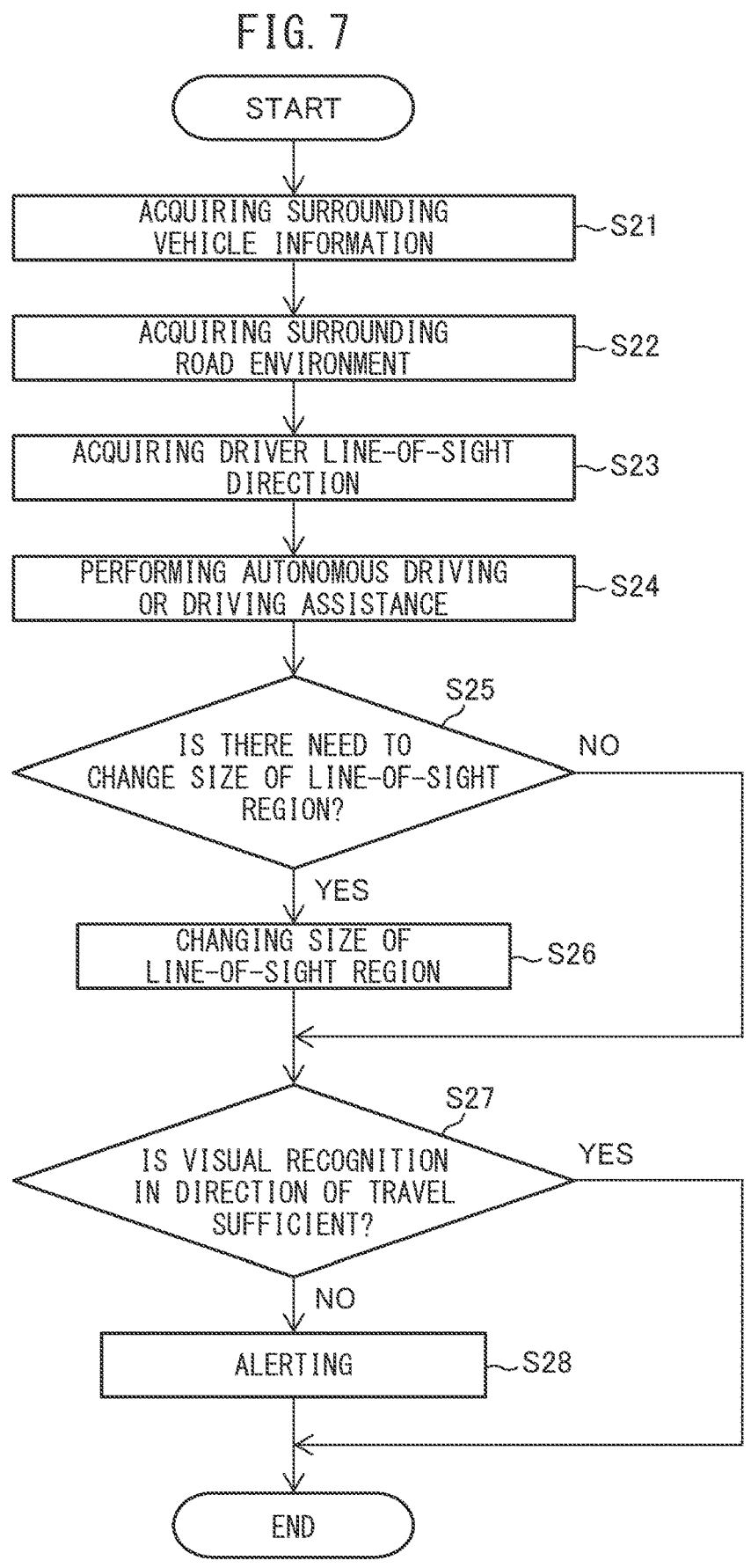
FIG. 7 is a flow chart for explaining one example of processing performed by the processor 23 of the driver monitoring device 12 of a second embodiment.

FIG. 7 is a flow chart for explaining one example of processing performed by the processor 23 of the driver monitoring device 12 of the second embodiment.

In the example shown in FIG. 7, at step S21, the surrounding vehicle information acquisition part 231A of the acquisition part 231 acquires the surrounding vehicle information which is the information showing stopped or decelerating surrounding vehicles in the surrounding region of the host vehicle 10.

At step S22, the surrounding road environment information acquisition part 231B of the acquisition part 231 acquires the surrounding road environment information which is the information showing the road environment of the surrounding region of the host vehicle 10.

At step S23, the line-of-sight direction information acquisition part 231C of the acquisition part 231 acquires the driver line-of-sight direction information which is the information showing the direction of line-of-sight of the driver of the host vehicle 10.

At step S24, the vehicle control part 232A of the control part 232 performs autonomous driving or driving assistance of the host vehicle 10 based on the surrounding vehicle information acquired at step S21 and the surrounding road environment information acquired at step S22.

At step S25, the determination criterion changing part 232D of the control part 232 determines whether there is a need to change the size of the line-of-sight region SR as the non-visual recognition determination criterion used for determining that the visual recognition in the direction of travel of the host vehicle 10 by the driver of the host vehicle 10 is not sufficient. When the number of stopped or decelerating surrounding vehicles in the surrounding region of the host vehicle 10 changes, the determination criterion changing part 232D determines that there is a need to change the size of the line-of-sight region SR as the non-visual recognition determination criterion and proceeds to step S26. On the other hand, when the number of stopped or decelerating surrounding vehicles in the surrounding region of the host vehicle 10 does not change, the determination criterion changing part 232D determines that there is no need to change the size of the line-of-sight region SR as the non-visual recognition determination criterion and proceeds to step S27.

At step S26, the determination criterion changing part 232D changes the size of the line-of-sight region SR as the non-visual recognition determination criterion used for determining that the visual recognition in the direction of travel of the host vehicle 10 by the driver of the host vehicle 10 is not sufficient. In more detail, at step S26, the determination criterion changing part 232D changes the size of the line-of-sight region SR as the non-visual recognition determination criterion so that the greater the number of stopped or decelerating surrounding vehicles in the surrounding region of the host vehicle 10, the easier it becomes to be determined that the visual recognition in the direction of travel of the host vehicle 10 by the driver of the host vehicle 10 is not sufficient. Specifically, when the number of stopped or decelerating surrounding vehicles in the surrounding region of the host vehicle 10 increases, the determination criterion changing part 232D narrows the line-of-sight region SR as the non-visual recognition determination criterion. On the other hand, when the number of stopped or decelerating surrounding vehicles in the surrounding region of the host vehicle 10 decreases, the determination criterion changing part 232D broadens the line-of-sight region SR as the non-visual recognition determination criterion. Next, it proceeds to step S27.

At step S27, the visual recognition determination part 232B of the control part 232 determines whether the visual recognition in the direction of travel of the host vehicle 10 by the driver of the host vehicle 10 is sufficient. If the driver of the host vehicle 10 does not gaze at the line-of-sight region SR even once (that is, if the region which the driver of the host vehicle 10 has gazed at does not include the line-of-sight region SR) during the non-visual recognition determination time which is the time when the driver of the host vehicle 10 must gaze at the direction of travel of the host vehicle 10, the visual recognition determination part 232B determines that the visual recognition in the direction of travel of the host vehicle 10 by the driver of the host vehicle 10 is not sufficient and proceeds to step S28. On the other hand, if the driver of the host vehicle 10 gazed at a line-of-sight region SR (that is, if the region which the driver of the host vehicle 10 has gazed at includes the line-of-sight region SR) during the non-visual recognition determination time, the visual recognition determination part 232B determines that the visual recognition in the direction of travel of the host vehicle 10 by the driver of the host vehicle 10 is sufficient and ends the routine shown in FIG. 7.

At step S28, the attention drawing part 232C of the control part 232 alerts the driver of the host vehicle 10.

As explained above, in the host vehicle 10 to which the driver monitoring device 12 of the second embodiment is applied, the size of the line-of-sight region SR as the non-visual recognition determination criterion used for determining that the visual recognition in the direction of travel of the host vehicle 10 by the driver of the host vehicle 10 is not sufficient is increased or decreased in accordance with the number of stopped or decelerating surrounding vehicles in the surrounding region of the host vehicle 10. For this reason, it is possible to suitably determine whether the visual recognition in the direction of travel of the host vehicle 10 by the driver of the host vehicle 10 is sufficient.

Third Embodiment

The host vehicle 10 to which the driver monitoring device 12 of the third embodiment is applied is configured in the same way as the above-mentioned host vehicle 10 to which the driver monitoring device 12 of the first embodiment is applied except for the points explained later.

As explained above, in the driver monitoring device 12 of the first embodiment, the visual recognition determination part 232B uses the non-visual recognition determination time which is the time when the driver of the host vehicle 10 must gaze at the direction of travel of the host vehicle 10 as the non-visual recognition determination criterion for determining whether the visual recognition in the direction of travel of the host vehicle 10 by the driver of the host vehicle 10 is sufficient.

On the other hand, in the driver monitoring device 12 of the third embodiment, the visual recognition determination part 232B uses the object region which is a region in the direction of travel of the host vehicle 10 which the driver of the host vehicle 10 must gaze at as the non-visual recognition determination criterion for determining whether the visual recognition in the direction of travel of the host vehicle 10 by the driver of the host vehicle 10 is sufficient. As explained above, the object region is a region corresponding to an object (for example, the surrounding vehicle, the moving body, etc.) detected by the external camera 2, the radar 3, and the LiDAR 4 as the object outside the host vehicle 10.

As explained above, in the driver monitoring device 12 of the first embodiment, the determination criterion changing part 232D shortens the non-visual recognition determination time as the non-visual recognition determination criterion for raising the sensitivity of the visual recognition determination (that is, for making it easier to be determined that the visual recognition in the direction of travel of the host vehicle 10 by the driver of the host vehicle 10 is not sufficient).

On the other hand, in the driver monitoring device 12 of the third embodiment, the determination criterion changing part 232D broadens the object region as the non-visual recognition determination criterion for raising the sensitivity of the visual recognition determination.

Figure 8:
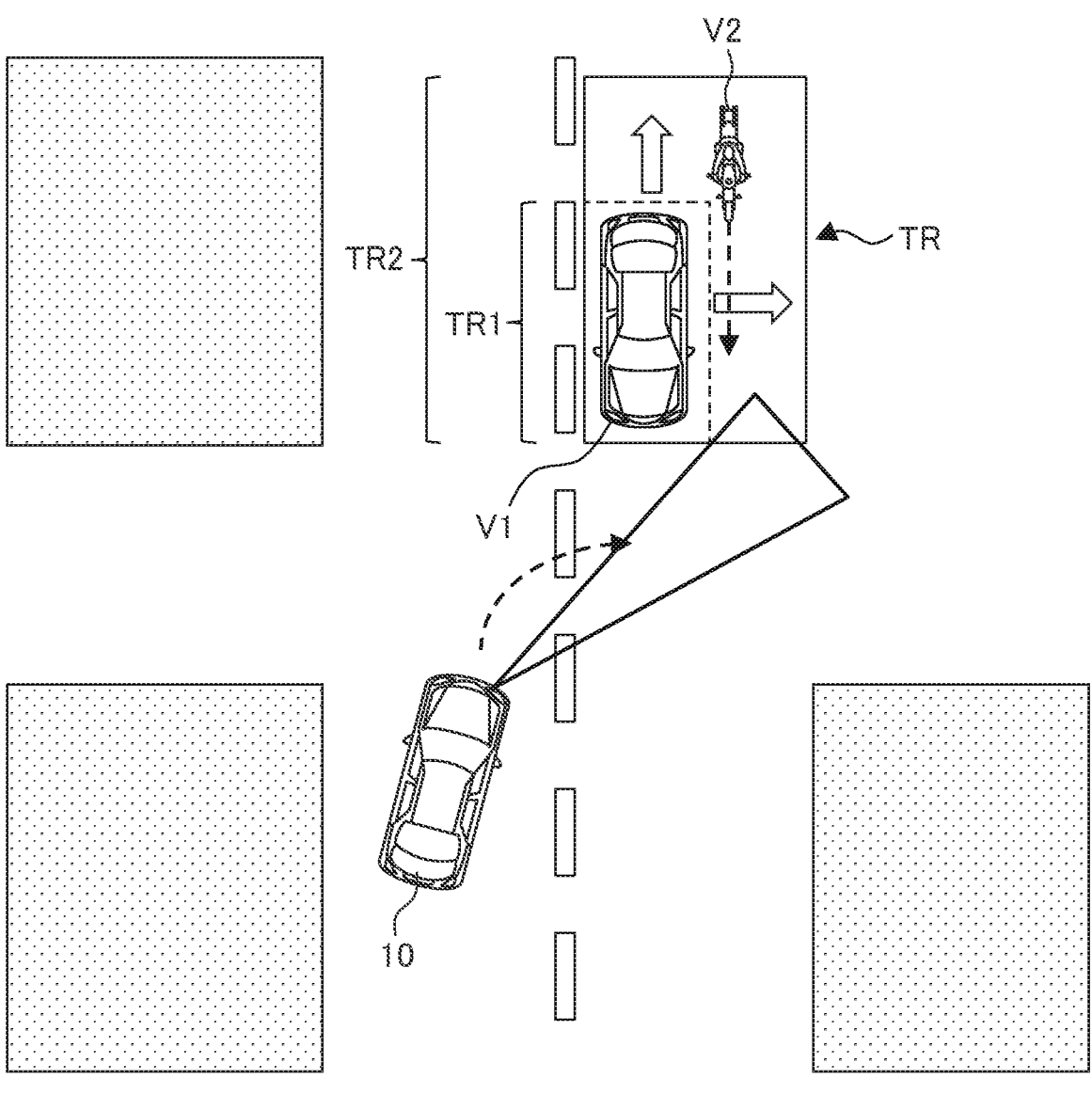
FIG. 8 is a view for explaining one example of object regions TR (TR1, TR2) as the non-visual recognition determination criterion.

FIG. 8 is a view for explaining one example of object regions TR (TR1, TR2) as the non-visual recognition determination criterion.

In the example shown in FIG. 8, in the same way as the example shown in FIG. 3, the host vehicle 10 is turning right at the intersection and the oncoming vehicle (the surrounding vehicle V1) of the host vehicle 10 is stopped for turning right at that intersection. Further, when the host vehicle 10 turns right and passes in front of the surrounding vehicle V1, the surrounding vehicle V2 (two-wheeled vehicle) may run out from behind the stopped surrounding vehicle V1 (blind spot for the driver of the host vehicle 10) toward the host vehicle 10. For this reason, the driver of the host vehicle 10 must sufficiently visually check (gaze at) the direction of travel of the host vehicle 10 (in particular, the region adjoining the stopped surrounding vehicle V1 where the surrounding vehicle V2 positioned on the opposite side of the host vehicle 10 across the stopped surrounding vehicle V1 may run out toward the host vehicle 10).

The visual recognition determination part 232B of the control part 232 sets the object region TR1 (region of direction of travel of host vehicle 10 which driver of the host vehicle 10 must gaze at) corresponding to the surrounding vehicle V1 detected as the object outside the host vehicle 10 by the external camera 2, the radar 3, and the LiDAR 4. The object region TR1 set by the visual recognition determination part 232B does not include the region adjoining the surrounding vehicle V1 (region where the surrounding vehicle V2 may run out toward the host vehicle 10). For this reason, by being based on the object region TR1 set by the visual recognition determination part 232B, the driver of the host vehicle 10 cannot be made to gaze at the region adjoining the surrounding vehicle V1 (region where the surrounding vehicle V2 may run out toward the host vehicle 10).

Therefore, in the driver monitoring device 12 of the third embodiment, the determination criterion changing part 232D performs processing to broaden the object region TR as the non-visual recognition determination criterion which is the region in the direction of travel of the host vehicle 10 which the driver of the host vehicle 10 must gaze at from the object region TR1 to the object region TR2. As shown in FIG. 8, the object region TR2 includes the region adjoining the stopped surrounding vehicle V1 where the surrounding vehicle V2 positioned on the opposite side of the host vehicle 10 across the stopped surrounding vehicle V1 may run out toward the host vehicle 10.

Furthermore, the visual recognition determination part 232B determines that the visual recognition in the direction of travel of the host vehicle 10 by the driver of the host vehicle 10 is not sufficient if the region which the driver of the host vehicle 10 is gazing at during the non-visual recognition determination time which is the time when the driver of the host vehicle 10 must gaze at the direction of travel of the host vehicle 10 is narrower than the object region TR2 (if the region which the driver of the host vehicle 10 is gazing at does not include, for example, the region adjoining the stopped surrounding vehicle V1 where the surrounding vehicle V2 positioned on the opposite side of the host vehicle 10 across the stopped surrounding vehicle V1 may run out toward the host vehicle 10). The attention drawing part 232C alerts the driver of the host vehicle 10 when the visual recognition determination part 232B determines that the visual recognition in the direction of travel of the host vehicle 10 by the driver of the host vehicle 10 is not sufficient.

That is, in the driver monitoring device 12 of the third embodiment, the determination criterion changing part 232D has the function of changing the object region TR (in more detail, changing the size of the object region TR) as the non-visual recognition determination criterion used by the visual recognition determination part 232B for determining that the visual recognition in the direction of travel of the host vehicle 10 by the driver of the host vehicle 10 is not sufficient.

In more detail, the determination criterion changing part 232D broaden the object region TR so that the greater the number of stopped or decelerating surrounding vehicles in the surrounding region of the host vehicle 10, the easier it becomes to be determined that the region which the driver of the host vehicle 10 is gazing at is narrower than the object region TR.

In the example shown in FIG. 8, the surrounding region of the host vehicle 10 includes only one stopped surrounding vehicle V1 (only one stopped surrounding vehicle V1 is detected by the external camera 2, the radar 3, and the LiDAR 4), so the object region TR2 broadened from the object region TR1 set by the visual recognition determination part 232B is used as the object region TR. The object region TR2 is, for example, a region combining a stopped vehicle region (object region TR1) which is a region of the stopped surrounding vehicle V1 in the surrounding region of the host vehicle 10 and an adjoining region which is a region adjoining the stopped vehicle region. This adjoining region is a region where the surrounding vehicle V2 as the moving body running out toward the host vehicle 10 can be positioned.

In an example where the surrounding region of the host vehicle 10 does not include a stopped or decelerating surrounding vehicle, the object region TR1 set by the visual recognition determination part 232B is used as the object region TR.

In an example where the surrounding region of the host vehicle 10 includes two or more stopped or decelerating surrounding vehicles (example where in addition to the stopped surrounding vehicle V1, one or more stopped or decelerating surrounding vehicles (not shown) are detected by the external camera 2, the radar 3, and the LiDAR 4), the determination criterion changing part 232D broadens the object region TR from the object region TR2 to an object region which is larger than the object region TR2 (not shown). As a result, it becomes easier to be determined that the region which the driver of the host vehicle 10 is gazing at is narrower than the object region broadened by the determination criterion changing part 232D.

In the example shown in FIG. 4, an object region corresponding to the surrounding vehicle V3 is broadened by the determination criterion changing part 232D so that the region positioned between the decelerating surrounding vehicle V3 in the surrounding region of the host vehicle 10 and the on-road parked surrounding vehicle V4 in the surrounding region of the host vehicle 10 where the moving body MD positioned between the surrounding vehicle V3 and the surrounding vehicle V4 may run out toward the host vehicle 10 (region on broken line arrow extending from the moving body MB) is included in an object region corresponding to the surrounding vehicle V3.

The object region corresponding to the surrounding vehicle V3 broadened by the determination criterion changing part 232D is a region combining a decelerating vehicle region which is a region of the decelerating surrounding vehicle V3 in the surrounding region of the host vehicle 10 and an intermediate region which is a region positioned between the decelerating surrounding vehicle V3 and the on-road parked surrounding vehicle V4 in the surrounding region of the host vehicle 10. That intermediate region is a region where the moving body MB running out toward the host vehicle 10 can be positioned.

FIG. 9 is a flow chart for explaining one example of processing performed by the processor 23 of the driver monitoring device 12 of the third embodiment.

In the example shown in FIG. 9, at step S31, the surrounding vehicle information acquisition part 231A of the acquisition part 231 acquires the surrounding vehicle information which is the information showing stopped or decelerating surrounding vehicles in the surrounding region of the host vehicle 10.

At step S32, the surrounding road environment information acquisition part 231B of the acquisition part 231 acquires the surrounding road environment information which is the information showing the road environment of the surrounding region of the host vehicle 10.

At step S33, the line-of-sight direction information acquisition part 231C of the acquisition part 231 acquires the driver line-of-sight direction information which is the information showing the direction of line-of-sight of the driver of the host vehicle 10.

At step S34, the vehicle control part 232A of the control part 232 performs autonomous driving or driving assistance of the host vehicle 10 based on the surrounding vehicle information acquired at step S31 and the surrounding road environment information acquired at step S32. At step S35, the determination criterion changing part 232D of the control part 232 determines whether there is a need to change the size of the object region TR as the non-visual recognition determination criterion used for determining that the visual recognition in the direction of travel of the host vehicle 10 by the driver of the host vehicle 10 is not sufficient. When the number of stopped or decelerating surrounding vehicles in the surrounding region of the host vehicle 10 changes, the determination criterion changing part 232D determines that there is a need to change the size of the object region TR as the non-visual recognition determination criterion and proceeds to step S36. On the other hand, when the number of stopped or decelerating surrounding vehicles in the surrounding region of the host vehicle 10 is not changed, the determination criterion changing part 232D determines that there is no need to change the size of the object region TR as the non-visual recognition determination criterion and proceeds to step S37.

At step S36, the determination criterion changing part 232D changes the size of the object region TR as the non-visual recognition determination criterion used for determining that the visual recognition in the direction of travel of the host vehicle 10 by the driver of the host vehicle 10 is not sufficient. In more detail, at step S36, the determination criterion changing part 232D changes the size of the object region TR as the non-visual recognition determination criterion so that the greater the number of stopped or decelerating surrounding vehicles in the surrounding region of the host vehicle 10, the easier it becomes to be determined that the visual recognition in the direction of travel of the host vehicle 10 by the driver of the host vehicle 10 is not sufficient. Specifically, when the number of stopped or decelerating surrounding vehicles in the surrounding region of the host vehicle 10 increases, the determination criterion changing part 232D broadens the object region TR as the non-visual recognition determination criterion. On the other hand, when the number of stopped or decelerating surrounding vehicles in the surrounding region of the host vehicle 10 decreases, the determination criterion changing part 232D narrows the object region TR as the non-visual recognition determination criterion. Next, it proceeds to step S37.

At step S37, the visual recognition determination part 232B of the control part 232 determines whether the visual recognition in the direction of travel of the host vehicle 10 by the driver of the host vehicle 10 is sufficient. If the region which the driver of the host vehicle 10 is gazing at during the non-visual recognition determination time which is the time when the driver of the host vehicle 10 must gaze at the direction of travel of the host vehicle 10 is narrower than the object region, the visual recognition determination part 232B determines that the visual recognition in the direction of travel of the host vehicle 10 by the driver of the host vehicle 10 is not sufficient and proceeds to step S38. On the other hand, if the region which the driver of the host vehicle 10 is gazing at during the non-visual recognition determination time is not narrower than the object region, the visual recognition determination part 232B determines that the visual recognition in the direction of travel of the host vehicle 10 by the driver of the host vehicle 10 is sufficient and ends the routine shown in FIG. 9.

At step S38, the attention drawing part 232C of the control part 232 alerts the driver of the host vehicle 10.

As explained above, in the host vehicle 10 to which the driver monitoring device 12 of the third embodiment is applied, the size of the object region TR as the non-visual recognition determination criterion used for determining that the visual recognition in the direction of travel of the host vehicle 10 by the driver of the host vehicle 10 is not sufficient is increased or decreased in accordance with the number of stopped or decelerating surrounding vehicles in the surrounding region of the host vehicle 10. For this reason, it is possible to suitably determine whether the visual recognition in the direction of travel of the host vehicle 10 by the driver of the host vehicle 10 is sufficient.

In the above way, embodiments of the driver monitoring device, driver monitoring method, and non-transitory recording medium of the present disclosure were explained referring to the drawings, but the driver monitoring device, driver monitoring method, and non-transitory recording medium of the present disclosure are not limited to the above-mentioned embodiments and can be suitably changed in a range not deviating from the gist of the present disclosure. The configurations of the examples of the embodiments explained above may also be suitably combined.

In the examples of the above-mentioned embodiments, the processing performed in the driver monitoring device 12 (autonomous driving ECU or driving assistance ECU) was explained as software processing performed by running a program stored in the memory 22, but the processing performed at the driver monitoring device 12 may also be processing performed by hardware. Alternatively, the processing performed by the driver monitoring device 12 may also be processing combining both software and hardware. Further, a program stored in the memory 22 of the driver monitoring device 12 (program realizing functions of the processor 23 of the driver monitoring device 12) may also, for example, be provided, distributed, etc. recorded in a semiconductor memory, magnetic recording medium, optical recording medium or other such computer readable storage medium (non-transitory recording medium).

The invention claimed is:

1. A driver monitoring device comprising a processor configured to:

acquire surrounding vehicle information which is information showing stopped or decelerating surrounding vehicles in a surrounding region of a host vehicle, surrounding road environment information which is information showing a road environment in the surrounding region, and driver line-of-sight direction information which is information showing a direction of a line-of-sight of a driver of the host vehicle;

perform autonomous driving or driving assistance of the host vehicle based on the surrounding vehicle information and the surrounding road environment information;

determine whether the driver's visual recognition in a direction of travel of the host vehicle is sufficient;

alert the driver when the driver's visual recognition in the direction of travel of the host vehicle is not sufficient;

change recognition determination criterion used for determining that the driver's visual recognition in the direction of travel of the host vehicle is not sufficient; and change the recognition determination criterion based on the number of the stopped or decelerating surrounding vehicles in the surrounding region by performing at least one of: shortening a recognition determination time, narrowing a line-of-sight region, or broadening an object region, wherein the processor is configured to detect multiple stopped surrounding vehicles as on-road parked vehicles arranged in parallel along the direction of travel of the host vehicle, and, in response, change the recognition determination time based on a cumulative count of the on-road parked vehicles.

2. The driver monitoring device according to claim 1, wherein as the recognition determination criterion, the recognition determination time, which is a time when the driver must gaze at the direction of travel of the host vehicle, is used; and wherein the processor is configured to shorten the recognition determination time based on the number of the stopped or decelerating surrounding vehicles in the surrounding region.

3. The driver monitoring device according to claim 1, wherein as the recognition determination criterion, the line-of-sight region, which is a region in the direction of travel of the host vehicle which the driver must gaze at, is used;

wherein the processor is configured to narrow the line-of-sight region greaterbased on the number of the stopped or decelerating surrounding vehicles in the surrounding region; and the processor is configured to determine that the driver's visual recognition in the direction of travel of the host vehicle is not sufficient if the region which the driver is gazing at during the recognition determination time, which is a time when the driver must gaze at the direction of travel of the host vehicle, does not include the line-of-sight region.

4. The driver monitoring device according to claim 3, wherein the line-of-sight region includes a region adjoining a stopped surrounding vehicle in the surrounding region where a moving body is positioned on an opposite side of the host vehicle across the stopped surrounding vehicle in the surrounding region.

5. The driver monitoring device according to claim 3, wherein the line-of-sight region includes a region positioned between a decelerating surrounding vehicle in the surrounding region and an on-road parked surrounding vehicle in the surrounding region where a moving body is positioned between the decelerating surrounding vehicle in the surrounding region and the on-road parked surrounding vehicle in the surrounding region.

6. The driver monitoring device according to claim 1, wherein as the recognition determination criterion, the object region, which is a region in the direction of travel of the host vehicle which the driver must gaze at, is used;

wherein the processor is configured to broaden the object region based on the number of the stopped or decelerating surrounding vehicles in the surrounding region; and the processor is configured to determine that the driver's visual recognition in the direction of travel of the host vehicle is not sufficient if the region which the driver is gazing at during the recognition determination time, which is time when the driver must gaze at the direction of travel of the host vehicle, is narrower than the object region.

7. The driver monitoring device according to claim 6, wherein the object region broadened by the processor is a region combining a stopped vehicle region, which is a region of a stopped surrounding vehicle in the surrounding region, and an adjoining region, which is a region adjoining the stopped vehicle region, and the adjoining region is a region where a moving body is positioned.

8. The driver monitoring device according to claim 6, wherein the object region broadened by the processor is a region combining a decelerating vehicle region, which is a region of a decelerating surrounding vehicle in the surrounding region, and an intermediate region, which is a region positioned between the decelerating vehicle region in the surrounding region and an on-road parked surrounding vehicle in the surrounding region, and the intermediate region is a region where a moving body is positioned.

9. A driver monitoring method comprising:

acquiring surrounding vehicle information which is information showing stopped or decelerating vehicles in a surrounding region of a host vehicle, surrounding road environment information which is information showing a road environment in the surrounding region, and driver line-of-sight direction information which is information showing a direction of a line-of-sight of a driver of the host vehicle; and performing autonomous driving or driving assistance of the host vehicle based on the surrounding vehicle information and the surrounding road environment information, wherein performing autonomous driving or driving assistance of the host vehicle includes determining whether the driver's visual recognition in a direction of travel of the host vehicle is sufficient;

alerting the driver when the driver's visual recognition in the direction of travel of the host vehicle is not sufficient; and changing recognition determination criterion used for determining that the driver's visual recognition in the direction of travel of the host vehicle is not sufficient, wherein the recognition determination criterion is changed based on the number of the stopped or decelerating surrounding vehicles in the surrounding region by performing at least one of: shortening a recognition determination time, narrowing a line-of-sight region, or broadening an object region, wherein the method includes detecting multiple stopped surrounding vehicles as on- road parked vehicles arranged in parallel along the direction of travel of the host vehicle, and, in response, changing the recognition determination time based on a cumulative count of the on-road parked vehicles.

10. A non-transitory recording medium having recorded thereon a computer program for causing a processor to execute a process comprising:

acquiring surrounding vehicle information which is information showing stopped or decelerating vehicles in a surrounding region of a host vehicle, surrounding road environment information which is information showing a road environment in the surrounding region, and driver line-of-sight direction information which is information showing a direction of a line-of-sight of a driver of the host vehicle; and performing autonomous driving or driving assistance of the host vehicle based on the surrounding vehicle information and the surrounding road environment information, wherein performing autonomous driving or driving assistance of the host vehicle includes determining whether the driver's visual recognition in a direction of travel of the host vehicle is sufficient;

alerting the driver when the driver's visual recognition in the direction of travel of the host vehicle is not sufficient; and changing recognition determination criterion used for determining that the driver's visual recognition in the direction of travel of the host vehicle is not sufficient, wherein the recognition determination criterion is changed based on the number of the stopped or decelerating surrounding vehicles in the surrounding region by performing at least one of: shortening a recognition determination time, narrowing a line-of-sight region, or broadening an object region, wherein the process includes detecting multiple stopped surrounding vehicles as on-road parked vehicles arranged in parallel along the direction of travel of the host vehicle, and, in response, changing the recognition determination time based on a cumulative count of the on-road parked vehicles.

\* \* \* \* \*